US012804157B2

(12) United States Patent
Nakamura et al.

(10) Patent No.: US 12,804,157 B2
(45) Date of Patent: Nov. 17, 2026

(54) IMAGE PROCESSING APPARATUS, IMAGE PROCESSING METHOD, GENERATION METHOD AND STORAGE MEDIUM

(71) Applicant: CANON KABUSHIKI KAISHA, Tokyo (JP)

(72) Inventors: Koki Nakamura, Tokyo (JP); Hiroyuki Hasegawa, Chiba (JP); Kazuki Hosoi, Tokyo (JP); Shunsuke Kawahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 18/059,498

(22) Filed: Nov. 29, 2022

(65) Prior Publication Data

US 2023/0179772 A1 Jun. 8, 2023

(30) Foreign Application Priority Data

Dec. 6, 2021 (JP) ................................. 2021-197872
Oct. 6, 2022 (JP) ................................. 2022-161834

(51) Int. Cl.
*G06T 5/70* (2024.01)
*G06T 5/60* (2024.01)
(Continued)

(52) U.S. Cl.
CPC ............. *H04N 19/136* (2014.11); *G06T 5/70* (2024.01); *H04N 19/184* (2014.11);
(Continued)

(58) Field of Classification Search
CPC ... G06T 5/70; G06T 5/60; G06T 2207/20084; G06T 2207/10004; G06T 2207/10016;
(Continued)

(56) References Cited

U.S. PATENT DOCUMENTS 5,589,954 A * 12/1996 Watanabe ............ H04N 1/6027 358/521
10,922,799 B2 2/2021 Hiasa
(Continued)

FOREIGN PATENT DOCUMENTS

CN 111010504 A 4/2020
JP 2004-363726 A 12/2004
(Continued)

OTHER PUBLICATIONS

Manu Mathew Thomas, Vaidyanathan, K., Gabor Liktor, & Forbes, A. G. (2020). A reduced-precision network for image reconstruction. ACM Transactions on Graphics, 39(6), 1-12. https://doi.org/10.1145/3414685.3417786 (Year: 2020).*
(Continued)

*Primary Examiner* — Gregory A Morse
*Assistant Examiner* — David Alexander Wambst
(74) *Attorney, Agent, or Firm* — Venable LLP

(57) ABSTRACT

An image processing apparatus compress tones of first image data and, by applying a neural network that performs predetermined image processing on image data whose tones have been compressed, output image data on which the predetermined image processing has been performed. The apparatus decompress the tones of the image data on which the predetermined image processing has been performed. The number of bits that represent a pixel value in the neural network is smaller than the number of bits that represent a pixel value of the first image data, and the apparatus compresses tones using a characteristic that the lower the brightness, more tones are allocated.

18 Claims, 16 Drawing Sheets

(51) Int. Cl.
*H04N 19/136* (2014.01)
*H04N 19/184* (2014.01)
*H04N 23/71* (2023.01)
*H04N 23/76* (2023.01)

(52) U.S. Cl.
CPC ............. *H04N 23/71* (2023.01); *H04N 23/76* (2023.01); *G06T 2207/20084* (2013.01)

(58) Field of Classification Search
CPC . G06T 2207/20012; G06T 2207/20081; G06T 2207/20104; G06T 2207/20208; G06T 2207/30232; G06T 5/80; H04N 19/136; H04N 19/184; H04N 23/71; H04N 23/76; H04N 1/6027
See application file for complete search history.

(56) References Cited

U.S. PATENT DOCUMENTS

| | | | | |
|---|---|---|---|---|
| 2019/0213719 | A1 | 7/2019 | Hiasa | |
| 2020/0111198 | A1 | 4/2020 | Hiasa | |
| 2020/0394772 | A1* | 12/2020 | Afra | G06F 17/11 |
| 2021/0150812 | A1* | 5/2021 | Su | G06N 3/0499 |

FOREIGN PATENT DOCUMENTS

| | | | | | |
|---|---|---|---|---|---|
| JP | 2019-121252 | A | | 7/2019 | |
| JP | 2020515135 | A | * | 5/2020 | H04N 21/44 |

OTHER PUBLICATIONS

Woods, R. E., & Gonzalez, R. C. (2018). Digital Image Processing (4th ed.). Pearson. (Year: 2018).*

Reinhard, E., Stark, M., Shirley, P., & Ferwerda, J. (2002). Photographic Tone Reproduction for Digital Images Photographic Tone Reproduction for Digital Images. https://www-old.cs.utah.edu/docs/techreports/2002/pdf/UUCS-02-001.pdf (Year: 2002).*

Eilertsen, G., Mantiuk, R. K., & Unger, J. (2017). A comparative review of tone-mapping algorithms for high dynamic range video. Computer Graphics Forum, 36(2), 565-592. https://doi.org/10.1111/cgf.13148 (Year: 2017).*

Manu Mathew Thomas, et al., "A Reduced-Precision Network for Image Reconstruction," ACM Transactions on Graphics, vol. 39, No. 6 (Dec. 2020 issue), Article 231, published Nov. 27, 2020, pp. 1-12, XP058683478, ISSN:0730-0301, DOI: 10.1145/3414685.3417786.

May 9, 2023 European Official Action in European Patent Appln. No. 22210106.5.

"A Reduced-Precision Network for Image Reconstruction" article.

Jun. 12, 2026 Chinese Official Action in Chinese Patent Appln. No. 202211578815.9.

"Convolutional Neural Network with INT4 Optimization on Xilinx Devices," Xilinx, WP521 (v1.0.1), Jun. 24, 2020.

Jun. 5, 2026 Japanese Official Action in Japanese Patent Appln. No. 2022-161834.

* cited by examiner

IMAGE PROCESSING APPARATUS, IMAGE PROCESSING METHOD, GENERATION METHOD AND STORAGE MEDIUM

BACKGROUND OF THE INVENTION

Field of the Invention

The present invention relates to an image processing apparatus, an image processing method, a generation method, and a storage medium.

Description of the Related Art

Conventionally, image processing techniques in which is used a neural network (deep neural network) in which a plurality of layers are included in an intermediate layer are known. Noise may be generated in an image that has been captured by an image capturing apparatus (e.g., a camera) depending on settings and image capturing conditions of the image capturing apparatus at the time of image capturing, and by inputting the captured image into a deep neural network, it is possible to remove the noise of the captured image. Japanese Patent Laid-Open No. 2019-121252 discloses a technique for outputting an image that has been subjected to processing, such as compression noise removal and upsampling, by a neural network.

Incidentally, since the computation amount of processing in which is used a neural network, such as that of a convolutional neural network (CNN), is generally large, it is conceivable to limit the computation precision in the network (e.g., to INT8) in order to reduce the computation amount.

In the technique that has been proposed in Japanese Patent Laid-Open No. 2019-121252, consideration has not been given to a case of performing processing with an INT8 precision in a CNN in a case where an image capturing sensor outputs an image whose pixel values are represented by a number of bits that is greater than 8 bits, for example. That is, in the technique that has been proposed in Japanese Patent Laid-Open No. 2019-121252, when a CNN that represents pixel values by a number of bits that is smaller than that of an image to be processed processes the image, there is a problem that the number of bits of pixel values is reduced, and thereby tone is lost.

SUMMARY OF THE INVENTION

The present invention has been made in view of the above problems, and an object of the present invention is to enable even a neural network that supports a limited number of bits to perform appropriate processing.

In order to solve the aforementioned issues, one aspect of the present disclosure provides an image processing apparatus comprising: one or more processors; and a memory storing instructions which, when the instructions are executed by the one or more processors, cause the image processing apparatus to function as: a tone compression unit configured to compress tones of first image data; a processing unit configured to, by applying a neural network that performs predetermined image processing on image data whose tones have been compressed by the tone compression unit, output image data on which the predetermined image processing has been performed; and a tone decompression unit configured to decompress the tones of the image data on which the predetermined image processing has been performed, wherein the number of bits that represent a pixel value in the neural network is smaller than the number of bits that represent a pixel value of the first image data, and the tone compression unit compresses tones using a characteristic that the lower the brightness, more tones are allocated.

Another aspect of the present disclosure provides an image processing apparatus, which trains a neural network, the apparatus comprising: one or more processors; and a memory storing instructions which, when the instructions are executed by the one or more processors, cause the image processing apparatus to function as: a tone compression unit configured to compress tones of image data of a training image and tones of image data of a ground truth image; a processing unit configured to, by applying a neural network that performs predetermined image processing on image data for which the tones of the image data of the training image have been compressed, output image data on which the predetermined image processing has been performed; and a change unit configured to change parameters of the neural network based on an error between the image data on which the predetermined image processing has been performed and image data for which the tones of the image data of the ground truth image has been compressed, wherein the number of bits that represent a pixel value in the neural network is smaller than the number of bits that represent a pixel value of the image data of the training image, and the tone compression unit compresses tones using a characteristic that the lower the brightness, more tones are allocated.

Still another aspect of the present disclosure provides an image processing method comprising: compressing tones of first image data; by applying a neural network that performs predetermined image processing on image data whose tones have been compressed, outputting image data on which the predetermined image processing has been performed; and decompressing the tones of the image data on which the predetermined image processing has been performed, wherein the number of bits that represent a pixel value in the neural network is smaller than the number of bits that represent a pixel value of the first image data, and in the compressing, tones are compressed using a characteristic that the lower the brightness, more tones are allocated.

Yet still another aspect of the present disclosure provides a generation method of a trained neural network for which each step is performed in an image processing apparatus, the method comprising: compressing tones of image data of a training image and tones of image data of a ground truth image; by applying a neural network that performs predetermined image processing on image data for which the tones of the image data of the training image have been compressed, outputting image data on which the predetermined image processing has been performed; and changing parameters of the neural network based on an error between the image data on which the predetermined image processing has been performed and image data for which the tones of the image data of the ground truth image has been compressed, wherein the number of bits that represent a pixel value in the neural network is smaller than the number of bits that represent a pixel value of the image data of the training image, and in the compressing, tones are compressed using a characteristic that the lower the brightness, more tones are allocated.

Still yet another aspect of the present disclosure provides a non-transitory computer-readable storage medium comprising instructions for performing an image processing method comprising: compressing tones of first image data; by applying a neural network that performs predetermined image processing on image data whose tones have been compressed, outputting image data on which the predetermined image processing has been performed; and decompressing the tones of the image data on which the predetermined image processing has been performed, wherein the number of bits that represent a pixel value in the neural network is smaller than the number of bits that represent a pixel value of the first image data, and in the compressing, tones are compressed using a characteristic that the lower the brightness, more tones are allocated.

According to the present invention, it becomes possible for even a neural network that supports a limited number of bits to perform appropriate processing.

Further features of the present invention will become apparent from the following description of exemplary embodiments (with reference to the attached drawings).

DESCRIPTION OF THE EMBODIMENTS

Figure 1:
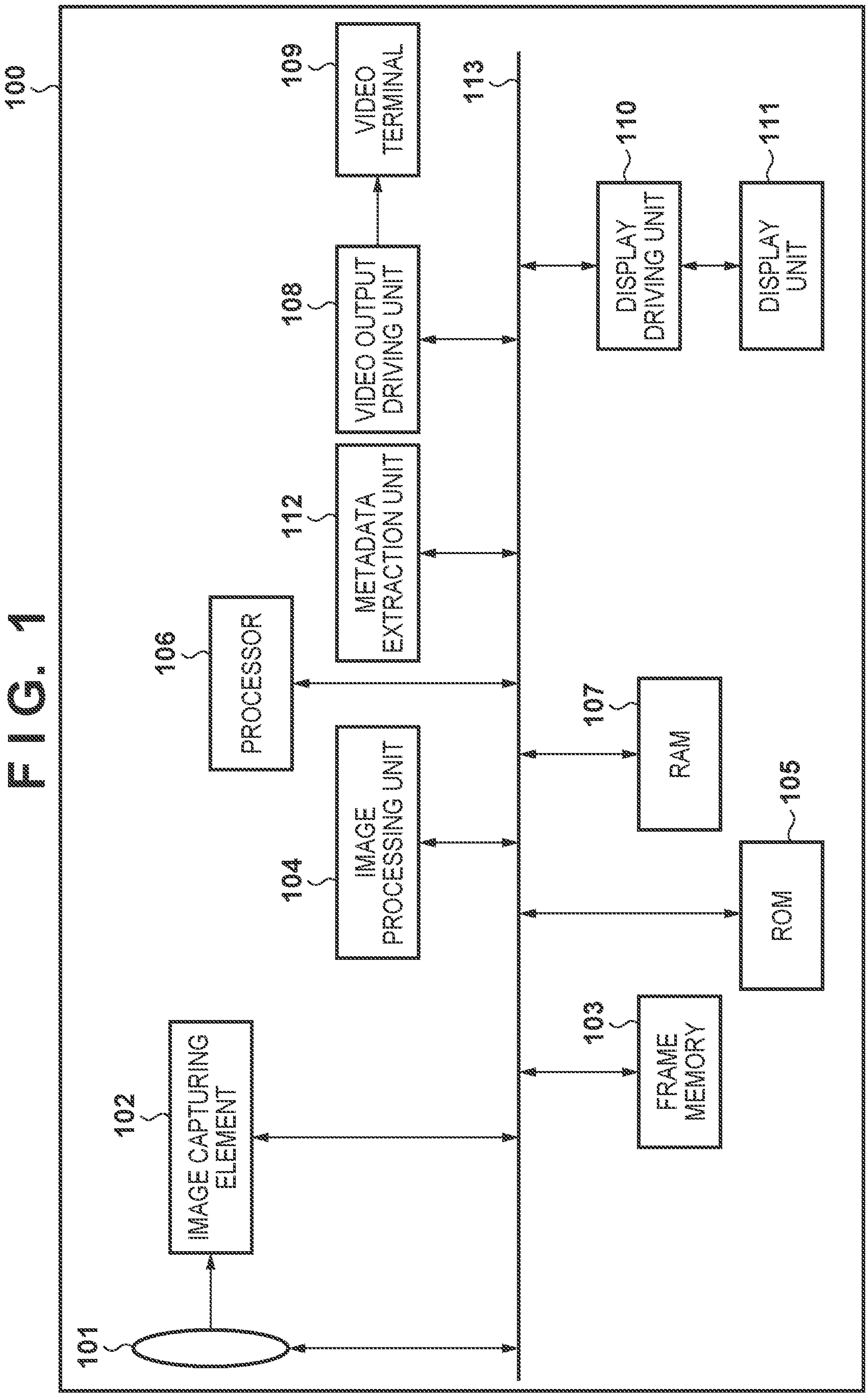
FIG. 1 is a block diagram illustrating an example of a functional configuration of an image capturing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Example of Configuration of Image Capturing Apparatus>

First, referring to FIG. 1, a description will be given for an example of a functional configuration of an image capturing apparatus that executes inference processing, which will be described later. In the following description, a description will be given using as an example a case where an image capturing apparatus that is a digital camera, for example, executes inference processing. However, so long as it can obtain an input image and execute inference processing, an image processing apparatus that does not include an image capturing unit can also implement the present embodiment. The image capturing apparatus or the image processing apparatus may be an electronic apparatus that is other than a digital camera so long as it is an electronic apparatus that is capable of performing inference processing. In the following embodiments, "first" and "second" have been added to facilitate understanding and do not necessarily refer to the same things as what "first" and "second" that have been added to in the scope of the claims.

An image capturing apparatus 100 includes, for example, a processor 106, a ROM 105, a RAM 107, an image processing unit 104, an optical lens 101, an image capturing element 102, a frame memory 103, a video output driving unit 108, a display driving unit 110, and a metadata extraction unit 112. Each of these units are connected to an internal bus 113. Each of the units that are connected to the internal bus 113 can exchange data with each other via the internal bus 113.

The optical lens 101 includes a lens and a motor for driving the lens. The optical lens 101 operates based on a control signal and can optically enlarge or reduce an image and adjust a focal length and the like. In addition, if it is desired to adjust the amount of incident light, it is possible to adjust the amount of light so as to achieve desired brightness by controlling a surface area of an aperture of a diaphragm. The light that has been transmitted via the lens is formed into an image by the image capturing element 102.

A CCD sensor, a CMOS sensor, or the like is used for the image capturing element 102 and the image capturing element 102 converts an optical signal into an electrical signal. The image capturing element 102 is driven based on a control signal and resets an electric charge in a pixel and controls a readout timing. The image capturing element 102 includes a function of performing gain processing on a pixel signal that has been read out as an electrical analog signal (voltage value) and a function of converting an analog signal into a digital signal; however gain processing and conversion into a digital signal may be performed outside of the image capturing element 102.

The image processing unit 104 performs various kinds of image processing on an image that has been output from the image capturing element 102. The image processing unit 104 can, for example, correct the amount of light in an image peripheral portion that has been generated due to characteristics of the optical lens 101, correct a sensitivity variation for each pixel of the image capturing element 102, perform color-related correction and flicker correction, and the like. The image processing unit 104 also includes a function of performing noise reduction processing using a neural network. Details of the noise reduction processing will be described later. The image processing unit 104 may be realized by the processor 106 or another processor, such as a GPU (not illustrated), executing a program.

The frame memory 103 includes a volatile storage medium. The frame memory 103 is called, for example, a random access memory (RAM) and is an element that can temporarily store a video signal and from which the video signal can be read out when needed. Since a video signal is of an enormous amount of data, the frame memory 103 needs to be high speed and high capacity. In recent years, a Dual Data Rate 4-Synchronous Dynamic RAM (DDR4-SDRAM) or the like, for example, has been used. The use of the frame memory 103 allows various kinds of processing. The frame memory 103 is useful in performing image processing, such as combining temporally different images and cutting out only a necessary region, for example.

The processor 106 may be configured by one or more processors, and the processor includes, for example, a central processing unit (CPU). The processor 106 may include, in addition to the CPU, a graphics processing unit (GPU) and an application-specific processor for processing specific computations, such as machine learning, at high speed. The processor 106 functions as a control unit for controlling the respective functions of the image capturing apparatus 100. A read only memory (ROM) and a RAM are connected to the processor 106. The ROM 105 is a non-volatile storage medium and stores programs for operating the processor 106, various adjustment parameters, and the like. The ROM 105 may also include information of a trained model for performing inference processing, such as learned weight parameters or hyperparameters of a deep neural network (also simply referred to as a neural network). The programs that have been read out from the ROM 105 are loaded into the volatile RAM 107 and executed. Regarding the RAM 107, a memory that is lower in speed and capacity than the frame memory 103 may be used. The neural network is configured to output, for example, an image which is an input image for which noise has been reduced but is not limited to this and may be configured to output a result image after performing some kind of predetermined image processing on the input image.

The metadata extraction unit 112 extracts metadata information, such as lens driving conditions and sensor driving conditions, for example. An image that has been generated by the image processing unit 104 is outputted from the image capturing apparatus 100 via the video output driving unit 108 and a video terminal 109. An interface that outputs images makes it possible to display a video in real time on an external monitor or the like. The interface may be any of a variety of interfaces, such as a serial digital interface (SDI), High Definition Multimedia Interface® (HDMI), and DisplayPort®, for example. An image that has been generated by the image processing unit 104 is displayed on a display device via the display driving unit 110 and a display unit 111.

The display unit 111 is a display device that allows a user to visually recognize display contents. The display unit 111 can display, for example, a video that has been processed by the image processing unit 104, a setting menu, and the like, and the user can confirm an operation status of the image capturing apparatus 100. A small, low-power device, such as a liquid crystal display (LCD) or an organic electroluminescence (EL), for example, can be used as a display device of the display unit 111. There may be cases where a resistance-film-type or a static-capacitance-type thin film element or the like called a touch panel is also provided in the display unit 111. The processor 106 generates a character string for informing the user of a setting state and the like of the image capturing apparatus 100 and a menu for setting the image capturing apparatus 100 and displays the character string and menu on the display unit 111, superimposed on an image that has been processed by the image processing unit 104. In addition to character information, image capturing assistance displays, such as histograms, vectorscopes, waveform monitors, zebra pattern, peaking, and false colors, may be superimposed.

<Overview of Image Processing System>

Next, an image processing system of the present embodiment will be described with reference to FIG. 2. The image processing system is a system that is capable of executing training processing, which will be described later. The image processing system is a system that is configured by an image capturing apparatus 200, an image processing apparatus 210, a display apparatus 220, and a storage apparatus 230. A configuration of an optical lens 201 and an image capturing element 202 of the image capturing apparatus 200 is substantially the same configuration as that of the optical lens 101 and the image capturing element 102 of the image capturing apparatus 100. A frame memory 203, an image processing unit 204, a ROM 205, a processor 206, and a RAM 207 of the image processing apparatus 210 are also substantially of the same configuration as the frame memory 103, the image processing unit 104, the ROM 105, the processor 106, and the RAM 107, respectively. A metadata extraction unit 208 and an internal bus 218 of the image processing apparatus 210 are also substantially of the same configuration as the metadata extraction unit 112 and the internal bus 113 of the image capturing apparatus 100, respectively. Therefore, a detailed description will be omitted for the configuration that is substantially the same as the configuration of the image capturing apparatus 100.

A camera control unit 209 in the image capturing apparatus 200 performs drive control of the optical lens 201 and the image capturing element 202 based on a communication signal that has been output from a camera communication connection unit 212 of the image processing apparatus 210.

An image signal reception unit 211 of the image processing apparatus 210 is a reception unit that receives an image signal that has been outputted from the image capturing element 202 of the image capturing apparatus 200. A GPU 213 includes one or more GPUs and is capable of performing processing for training a neural network in accordance with an instruction of the image processing unit 204 or the processor 206. Since a large amount of computation is necessary when executing training processing, in the present embodiment, a GPU whose throughput is higher than a CPU in terms of image processing is used. The GPU 213 may also be used to generate an image for display on the display apparatus 220. At that time, an image that has been generated by control by the GPU 213 is displayed on the display apparatus 220 via a display driving unit 216 and a display apparatus connection unit 217.

The storage apparatus 230 can be used to store enormous image data as training images. The storage apparatus 230 may also store network parameters (such as weight parameters of a neural network) that have been updated by training processing, hyperparameters, and the like. The image processing apparatus 210 exchanges data with the storage apparatus 230 via a storage driving unit 214 and a storage connection unit 215, which are included in the system.

Figure 2:
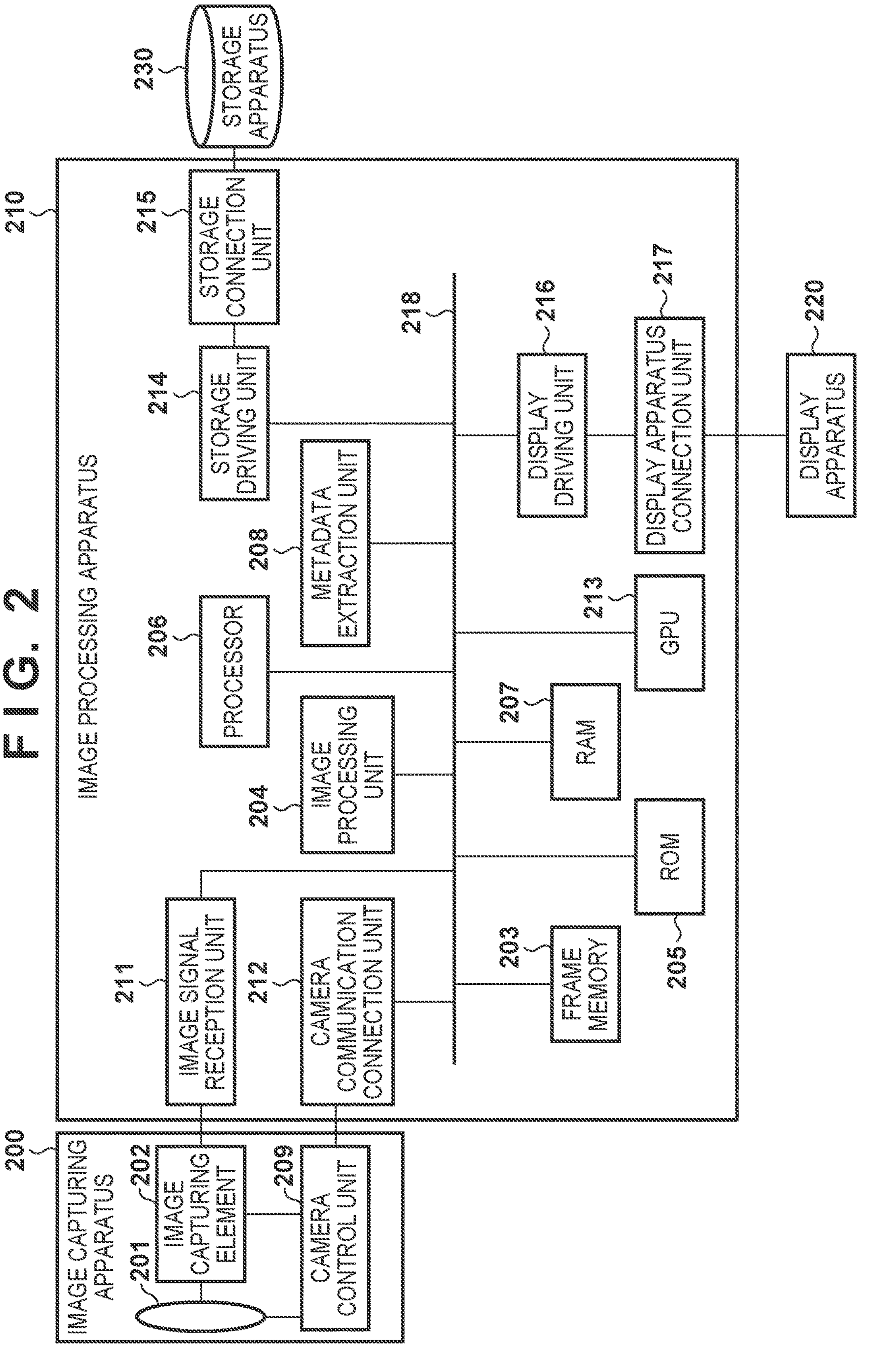
FIG. 2 is a block diagram illustrating an example of a functional configuration of an image processing system according to the first embodiment.

In the present embodiment, a description will be given using as an example a case where the image processing system, which is illustrated in FIG. 2, is used during a training processing operation and the image capturing apparatus 100, which is illustrated in FIG. 1, is used during an inference processing operation. However, the present invention is not limited to such use, and inference processing may be executed, for example, in the image processing system, which is illustrated in FIG. 2. In addition, in the present embodiment, as an example, it is assumed that training images are Bayer array images. However, images that have been captured using a three-plate-type image capturing sensor may be used, or images that have been captured by a vertical-color-separation-type image capturing sensor, such as a FOVEON sensor, or the like may be used. The same applies not only to a Bayer array but also to other arrangements (a honeycomb structure, a filter array of an X-Trans CMOS sensor, and the like). In a case of a Bayer array image, a single channel of a Bayer array may be used as is or each color channel may be separated out to make training images. In addition, in the present embodiment, a description will be given using as an example a case where the number of training images to be inputted into the neural network and the number of images to be outputted from the neural network each are one; however, a neural network in which a plurality of images are inputted and outputted may be used.

First Embodiment

<Inference Processing Operation in Image Capturing Apparatus>

Figure 3:
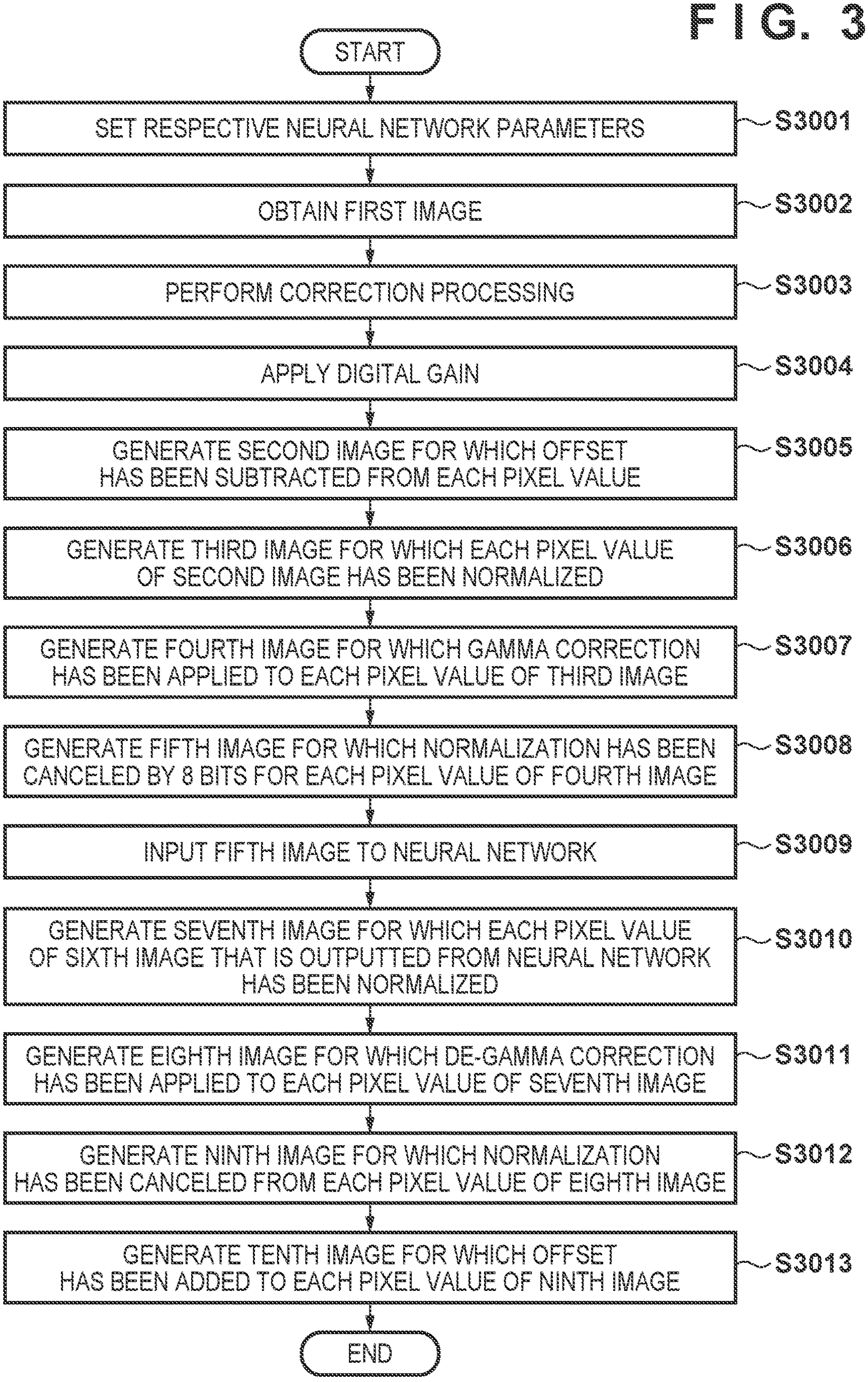
FIG. 3 is a flowchart for explaining an inference processing operation of the first embodiment.

Next, an inference processing operation in the image capturing apparatus 100 will be described with reference to FIGS. 3 and 4. A series of operations that is illustrated in FIG. 3 is realized, for example, by the processor 106 controlling the respective units of the image capturing apparatus 100 by executing a program that is stored in the ROM 105. An operation by the image processing unit 104 may be realized by the processor 106 or another processor, such as a GPU (not illustrated), executing a program that is stored in the ROM 105.

In step S3001, the processor 106 sets neural network parameters (network parameters) that are stored in the ROM 105 in a neural network in the image processing unit 104. As will be described later, the network parameters are, for example, weights, biases, and the like that configure the neural network. The network parameters that are to be set in step S3001 are calculated in advance, for example, by training processing of the image processing system, which is illustrated in FIG. 2.

In step S3002, the image capturing element 102 obtains a first image and outputs the obtained image to the image processing unit 104. In step S3003, the image processing unit 104 performs correction processing on the first image. Here, the correction processing is correction processing for reducing a variation of the optical lens 101 and the image capturing element 102 and the like and is, for example, correction of a peripheral light amount, correction of a sensitivity variation for each pixel, and the like. However, if the correction processing is unnecessary, this step does not need to be performed.

In step S3004, the image processing unit 104 applies a digital gain to the image on which the correction processing has been performed. In digital gain processing, if a pixel value includes an offset, the image processing unit 104 applies a gain after subtracting the offset from the pixel value and then adds the offset to the pixel value on which the gain has been applied.

In step S3005, the image processing unit 104 generates a second image for which an offset has been subtracted from each pixel value of the image on which the digital gain has been applied in step S3004. Here, the offset is a black level that has been added by the image capturing element 102. In step S3006, the image processing unit 104 generates a third image for which each pixel value of the second image has been normalized. In the present embodiment, each pixel value of the first image, which has been obtained from the image capturing element 102 in step S3002, is 14 bits, and up until the second image, which has been generated in step S3004, each pixel value is represented by 14-bit data. In the normalization here, to normalize each pixel value of 14 bits to a range from 0 to 1, each pixel value is divided by 2 to the power of 14, and the calculation result is handled in a float32 format, which includes digits after the decimal point, or the like.

In step S3007, the image processing unit 104 generates a fourth image for which gamma correction has been applied to each pixel value of the third image. The gamma correction here is applied in accordance with the following Equation (1). For example, gamma correction in the present embodiment includes a characteristic that the lower the brightness, the more tones are allocated.

[EQUATION 1]

$$f(x) = x^{\frac{1}{\gamma}} \tag{1}$$

In step S3008, the image processing unit 104 generates a fifth image for which normalization has been canceled such that each pixel value of the fourth image becomes 8 bits. In the cancelation of normalization here, to cancel the normalization so as to result in 8 bits, the image processing unit 104 multiplies each pixel value by 2 to the power of 8. The calculation result is handled in an INT8 format or the like. That is, the pixel value of the fifth image is represented by 8 bits.

Figure 4:
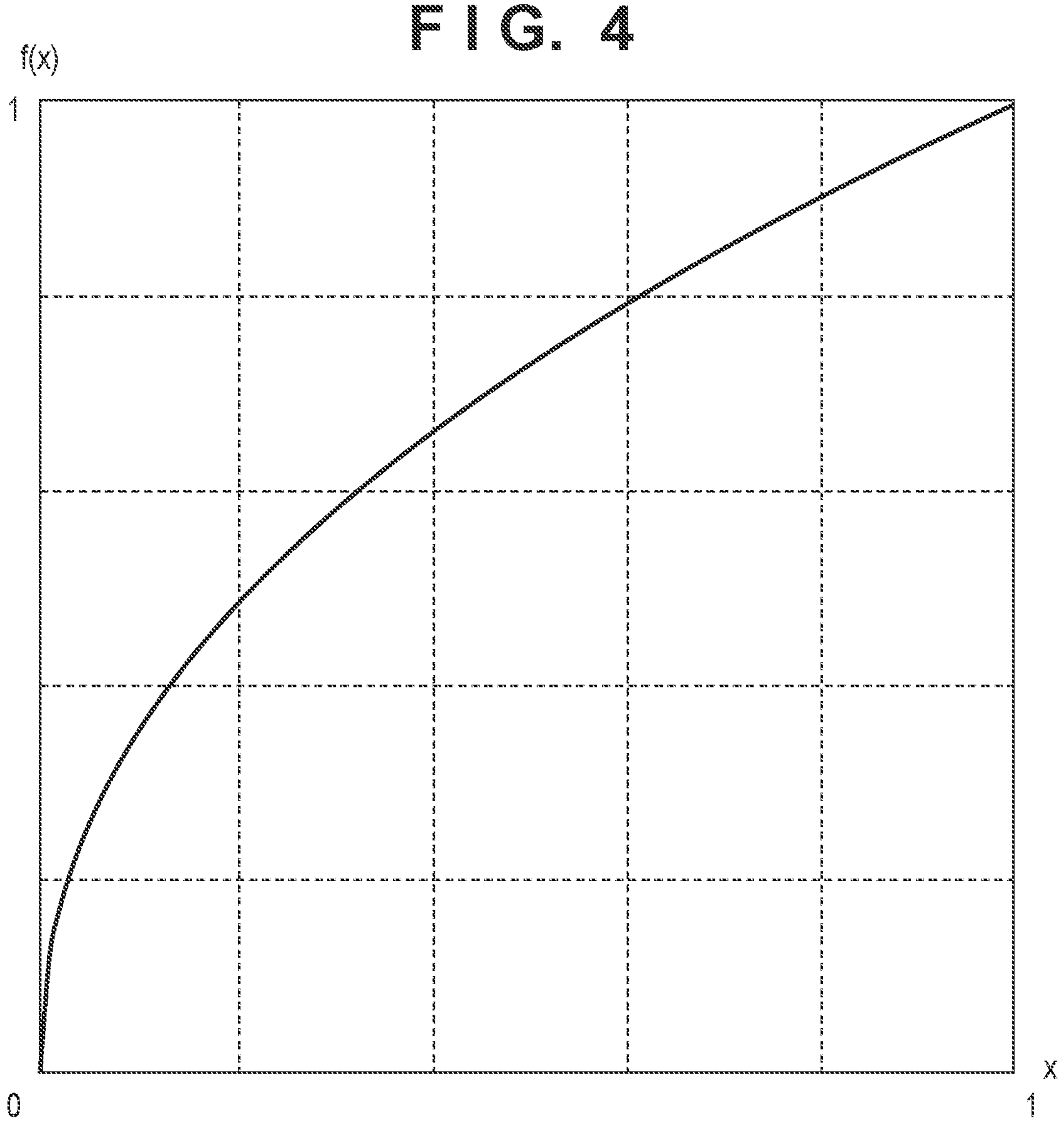
FIG. 4 is a graph for explaining gamma correction in an inference processing operation of the first embodiment.

Here, FIG. 4 illustrates characteristics of gamma correction in which a horizontal axis is a value of a pixel before gamma correction and a vertical axis is a pixel value after gamma correction. When $\gamma$ is greater than or equal to 1 in Equation (1), each of the pixel values of the fourth image define the gamma curve that is illustrated in FIG. 4. That is, by such a gamma correction, it becomes possible to obtain a gamma correction result in which many values are allocated to pixel values of a low luminance region before gamma correction, and thereby when normalization is canceled so as to result in 8 bits in step S3008, it becomes possible to maintain tones of lower bits.

In step S3009, the image processing unit 104 inputs the fifth image to the neural network. The neural network here is a trained neural network that has been trained to appropriately remove noise from the image that has been gamma-corrected in step S3007.

In step S3010, the image processing unit 104 generates a seventh image for which each pixel value of the sixth image that is outputted from the neural network has been normalized. In the normalization here, to normalize each pixel value of 8 bits to a range from 0 to 1, the image processing unit 104 divides each pixel value by 2 to the power of 8. The calculation result is handled in a float32 format, which includes digits after the decimal point, or the like.

In step S3011, the image processing unit 104 generates an eighth image for which de-gamma correction has been applied to each pixel value of the seventh image. The de-gamma correction here is applied, for example, in accordance with the following Equation (2).

[EQUATION 2]

$$f(x) = x^{\gamma} \tag{2}$$

In step S3012, the image processing unit 104 generates a ninth image for which normalization has been canceled by 14 bits for each pixel value of the eighth image. In the cancelation of normalization here, to cancel normalization so as to result in 14 bits, the image processing unit 104 multiplies each pixel value by 2 to the power of 14. The calculation result is handled in a 14-bit format. In the present embodiment, a description will be given using as an example a case where the normalization is canceled so as to result in 14 bits; however, the normalization may be canceled so as to result in other than 14 bits in accordance with a standard for outputting an image from the image capturing apparatus 100 and the number of bits.

In step S3013, the image processing unit 104 generates a tenth image for which an offset has been added to each pixel value of the ninth image. In the present embodiment, a description has been given using as an example a case where gamma correction as tone compression and de-gamma correction as tone decompression are each used; however, another method may be used. In addition, in the present embodiment, a description has been given using as an example a case where a digital gain is applied before input to the neural network. However, a configuration may be taken so as to apply digital gain after a pass through the neural network. In such a case, regarding the respective neural networks, those that have been appropriately trained with images before a digital gain is applied are used.

<Training Processing Operation in Image Processing System>

Figure 10:
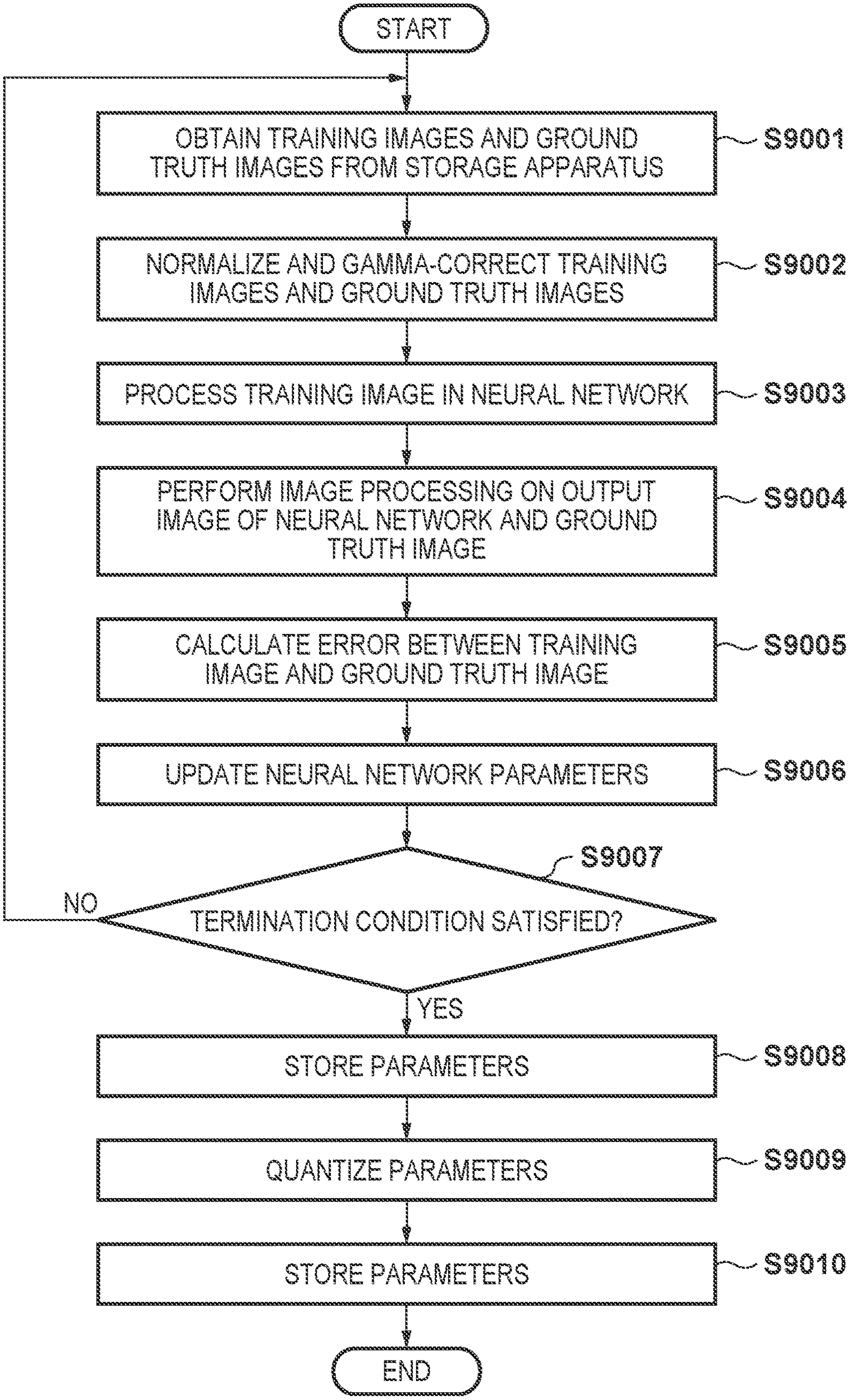
FIG. 10 is a flowchart for explaining a training processing operation of the first embodiment.

Next, a training processing operation in the image processing system (the image capturing apparatus 200, the image processing apparatus 210, the display apparatus 220, and the storage apparatus 230) will be described with reference to FIGS. 10 and 11. The training processing operation that is illustrated in FIG. 10 is realized by the processor 206 of the image processing apparatus 210 controlling the respective units (the image processing unit 204, the GPU 213, and the like) of the image processing apparatus 210 by deploying and executing in the RAM 207 a program that is stored in the ROM 205. The operation by the image processing unit 204 may be realized by the GPU 213 executing a program that is stored in the ROM 205.

In step S9001, the processor 206 obtains training images (noise images) and ground truth images (supervisory images) from the storage apparatus 230. Here, a training image is an image that includes noise. A ground truth image is an image in which a subject that is the same as that of the training image has been captured and there is no (or very little) noise. A training image can be generated, for example, by adding noise by simulation to a ground truth image in which the effect of noise is small. An image in which a subject that is the same as that of a ground truth image has been captured in a condition in which noise may actually occur (e.g., a high sensitivity setting) may also be used. In this case, for example, a training image is an image that has been captured with a low sensitivity, and a ground truth image is an image that has been captured with a high sensitivity or an image that has been captured in a low illuminance and on which sensitivity correction has been performed so as to correct it to be of the same degree of brightness as that of the ground truth image. A noise pattern and a structure (such as an edge) of a subject that are not included in the training processing operation cannot be accurately inferred in a later inference processing operation. Therefore, a plurality of training images and ground truth images, which have been generated so as to include various noise patterns and structures of subjects, are prepared. There may be one amount of noise, or a plurality of noise amounts may be mixed.

In step S9002, the processor 206 normalizes the training images and ground truth images that have been obtained in step S9001 by dividing them by a signal upper limit (saturated luminance value) and applies gamma correction to each pixel in accordance with the above-described Equation (1). In step S9003, the processor 206 selects at least one of the plurality of training images that have been gamma-corrected in step S9002 and generates an output image by inputting the selected training image into the neural network of the image processing unit 204. At this time, the noise amount of the training image to be used in the training processing operation may be the same as other training images or changed.

Processing to be performed in a neural network will be described with reference to FIG. 11. FIG. 11 schematically illustrates processing by a neural network. In an example that is illustrated in FIG. 11, a description will be given using as an example a convolutional neural network (CNN); however, the present embodiment is not limited to a CNN. A generative adversarial network (GAN) may be used as a neural network that outputs an image. Alternatively, a neural network may have a skip connection or the like or may be a recursive neural network, such as a recurrent neural network (RNN).

Figure 11:
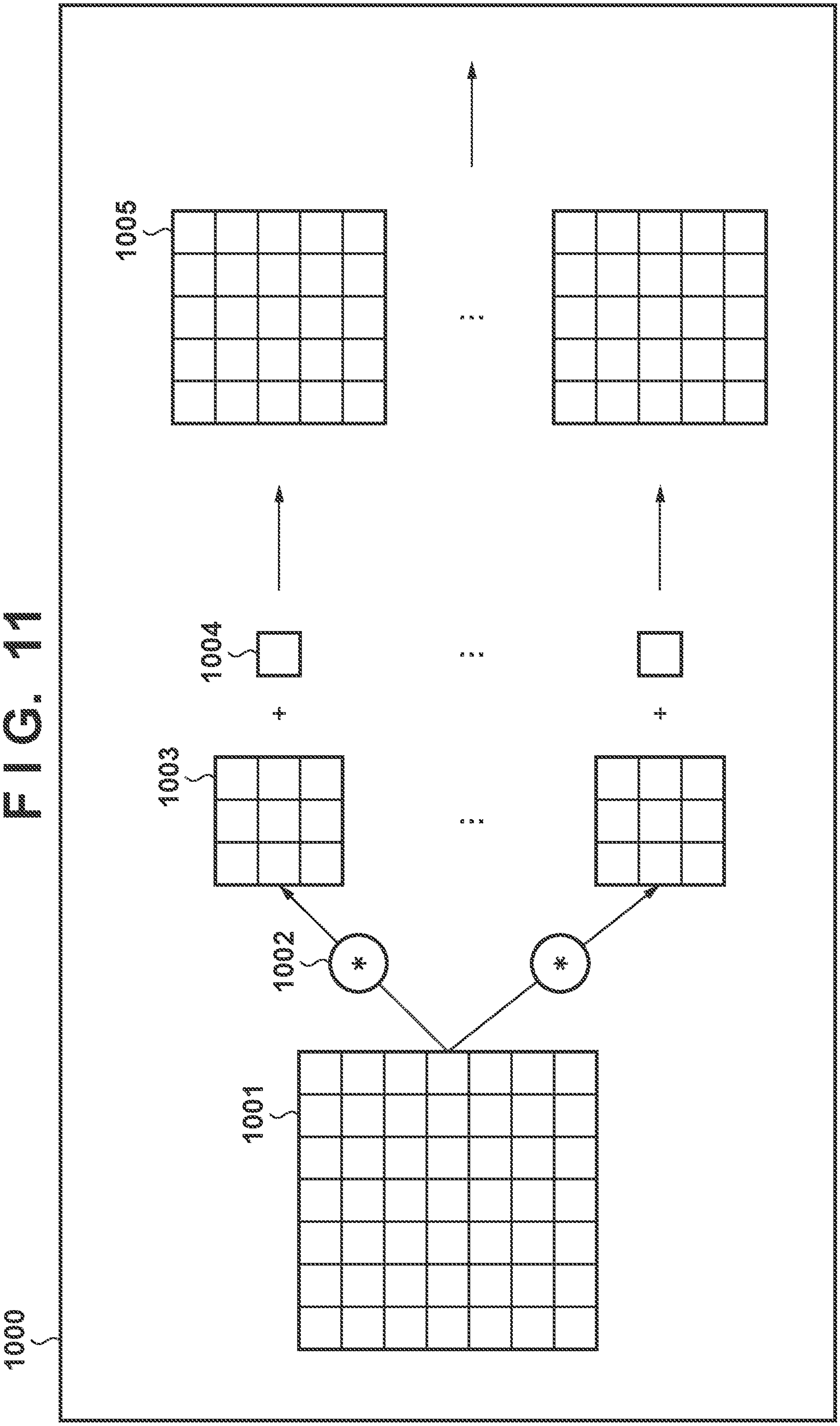
FIG. 11 is a diagram for conceptually explaining a neural network according to the first embodiment.

An input image 1001 that is illustrated in FIG. 11 represents an image to be inputted into a neural network or a feature map, which will be described later. An operation symbol 1002 represents a convolution operation. A convolution matrix 1003 is a filter that performs a convolution operation on the input image 1001. A bias 1004 is added to a result that has been outputted by the convolution operation of the input image 1001 and the convolution matrix 1003. A feature map 1005 is a convolution operation result to which the bias 1004 has been added. In FIG. 11, the respective neurons, intermediate layers, and channels have been drawn to be less in number for simplicity; however, the numbers of neurons and layers, the number and weights of connections between neurons, and the like are not limited to this. In addition, at a time of implementation in an FPGA or the like, the number of connections between neurons and weights may be reduced. In the present embodiment, the training processing operation and the inference processing operation are performed collectively for a plurality of color channels; however, the training processing operation and the inference processing operation may be performed individually for each color.

In a CNN, a feature map of an input image is obtained by executing a convolution operation of the input image by a certain filter. The size of the filter is arbitrary. In the next layer, a different feature map is obtained by executing a convolution operation with another filter on the feature map of the previous layer. In each layer, a certain input signal is multiplied by a weight of a filter, which represents a strength of a connection, and then is summed up with a bias. By applying an activation function to this result, an output signal in each neuron is obtained. The weights and biases in each layer are called network parameters, and the values thereof are updated by the training processing operation. Examples of commonly used activation functions include a sigmoid function, a ReLU function, and the like, and in the present embodiment, a Leaky ReLU function that accords with the following Equation (3) is used; however, the present invention is not limited to this.

[EQUATION 3]

$$f(x)=\max(x, x*0.2) \quad (3)$$

In Equation (3), max represents a function that outputs a maximum value among arguments.

A CNN includes a plurality of layers for repeatedly executing the convolution operation and, thereafter, may include one or more fully connected layers, for example, and after those fully connected layers, an output layer may be connected.

In step S9004, the image processing unit 204 performs image processing on an output image of the neural network and the ground truth image, respectively. By matching conditions of the image processing to be performed in the inference processing operation and conditions of the image processing to be performed by the training processing operation, it becomes possible to improve inference precision of noise reduction processing at the time of inference. Regarding a timing for performing the image processing, it may be executed at any time so long as it is prior to step S9004 and step S9005. For example, it may be executed on an input side of the neural network. When a plurality of patterns have been adopted for noise amounts of training images to be used in the training processing operation, even if a captured image that includes the amount of noise that is outside of the training is inputted at the time of inference, it is possible to effectively perform noise removal. If the number of training images is not sufficient, augmentation processing, such as cutting, rotation, and inversion, may be performed. In this case, the same processing needs to be performed on the ground truth images.

In step S9005, the image processing unit 204 calculates an error between the output image and the ground truth image on which image processing has been performed in step S9004. The ground truth image also has an array of color components that are arranged in the same manner as in the training image. Regarding the calculation of the error, a mean squared error of each pixel or a sum of absolute differences of each pixel is generally used; however, it may be calculated by another index. In step S9006, the image processing unit 204 updates the respective parameters of the neutral network using back propagation such that the error that has been calculated in step S9005 becomes small. However, the present embodiment is not limited to this. An update amount of each parameter may be fixed or varied.

Next, in step S9007, the processor 206 determines whether a predetermined termination condition has been satisfied, and if the condition is not satisfied, the processor 206 returns to step S9001 and newly advances the training. Meanwhile, if the predetermined termination condition is satisfied, the processing proceeds to step S9008. The predetermined termination condition may be that the number of epochs has reached a specified value or that the above error is equal to or less than a certain predetermined value. Alternatively, the processing may be terminated when the above error has almost stopped decreasing or upon the user's determination. Next, in step S9008, the processor 206 causes the storage apparatus 230 to store information related to network parameters that have been updated by training, a neural network structure, and the like. The storage apparatus 230 may be used to store the outputted network parameters. Although in the present embodiment a description has been given assuming that these will be stored in the storage apparatus, these may be stored in another storage medium.

In step S9009, the processor 206 performs quantization such that the parameters of the neural network that has been trained using FP32 will be in INT8. A bit width and data type of the data are not limited to this; a configuration may be taken such that FP16 parameters are used and quantization to INT4 is then performed. In step S9010, the processor 206 stores the quantized network parameters in a parameter storage region. The processor 206 terminates the training processing operation after the above operation. By this training processing, a trained neural network can be obtained.

Regarding processing that is other than noise reduction, similarly by simulation, a training processing operation can be executed by preparing a pair of a training image and a ground truth image. For example, in super-resolution, it is possible to prepare a training image by downsampling a ground truth image. At this time, sizes may be or may not be matched between the ground truth image and the training image. In addition, in a case of out-of-focus blur removal and shake blur removal (deburring), it is possible to prepare a training image by applying a blur function to a ground truth image. In a case of white balance correction, an image whose white balance is not appropriately adjusted or corrected may be used as a training image for a ground truth image in which image capturing has been performed with appropriate white balance. The same applies to color correction, such as color matrix correction. In a case of missing data interpolation, it is possible to obtain a training image by causing a ground truth image to lose data. In a case of demosaicing, a ground truth image may be prepared using a three-plate-type image capturing element or the like, and a training image may be prepared by resampling the ground truth image in a Bayer array or the like. Furthermore, in inference of color components, it is possible to prepare a training images by reducing color components in a ground truth image. Regarding dehazing, it is possible to prepare a training image by adding scattered light by simulation of a physical phenomenon to a ground truth image without fog or the like. In a case where a plurality of frames continue, such as in a moving image, when a desired number of frames are inputted to a neural network, collectively in a depth direction, it is possible to remove noise more effectively.

As described above, in the present embodiment, in a configuration in which the number of bits that represent a pixel value in a neural network is smaller than the number of bits that represent a pixel value of image data to be processed, tones of that image data are first compressed. Specifically, regarding the tones of the image data, the tones are compressed such that the lower the brightness, the more tones are allocated. Then, an output image is generated by applying a neural network for performing predetermined image processing to the image data whose tones have been compressed, and processing for decompressing tones is performed on the image data that has been outputted from the neural network. This makes it possible for even a neural network whose number of supported bits is limited to perform appropriate processing. In other words, it becomes possible to use a neural network with less computational load while suppressing reduction in tones of an image.

Second Embodiment

Next, a description will be given for a second embodiment. In the first embodiment, a gamma correction whose characteristic has been determined in advance is applied for tone compression; however, the second embodiment is different from the first embodiment in that a gamma correction whose characteristic varies depending on the brightness of an image to be processed is applied. However, examples of the configuration of the image capturing apparatus 100 and the functional configuration of the image processing system may be substantially the same as those of the first embodiment. Therefore, the same reference numerals are assigned to configurations and processing that are substantially the same, descriptions thereof will be omitted, and a description will be given mainly on points of difference.

<Inference Processing Operation in Image Capturing Apparatus>

Figure 5:
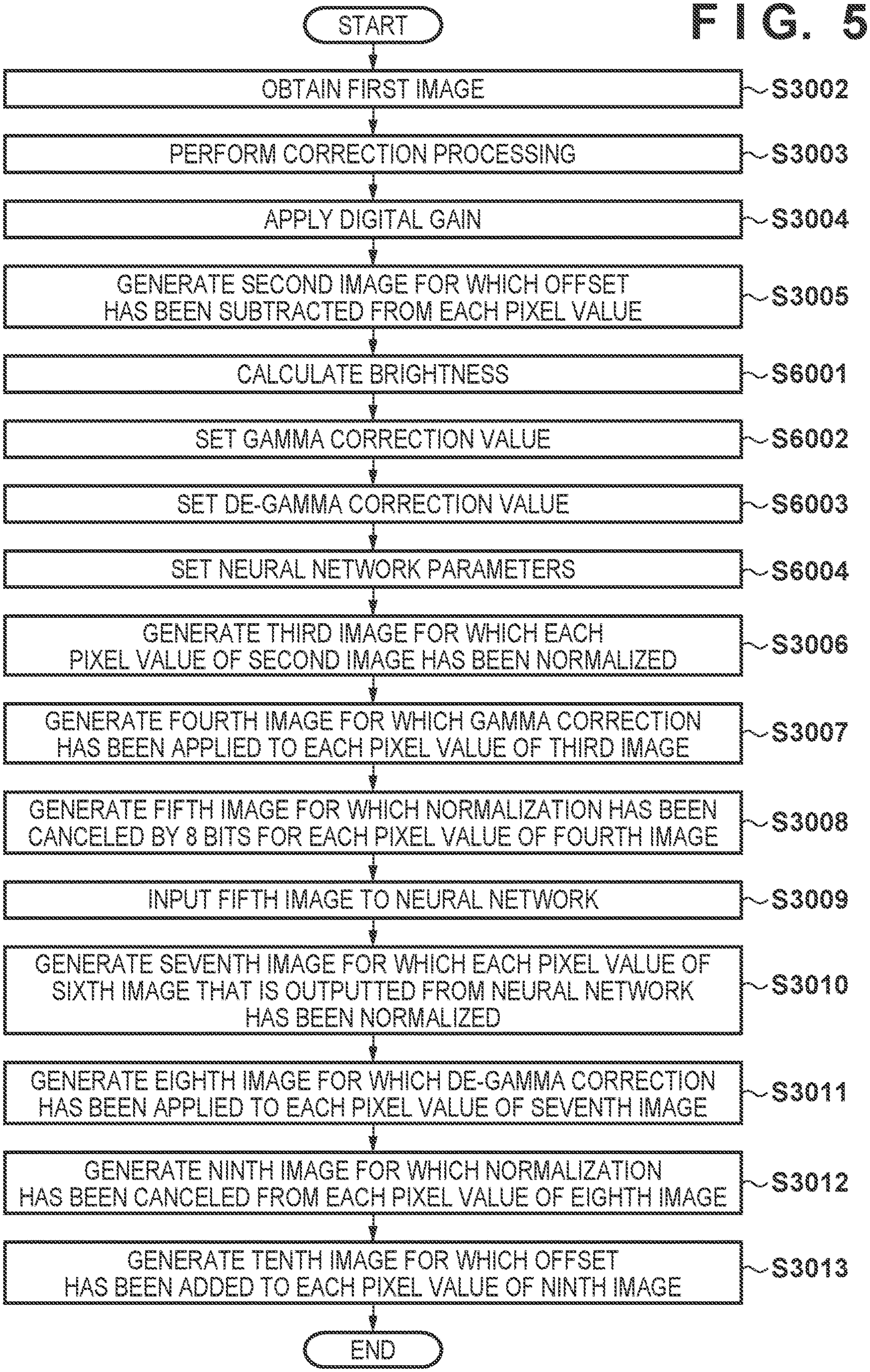
FIG. 5 is a flowchart for explaining an inference processing operation of a second embodiment.
Figure 6:
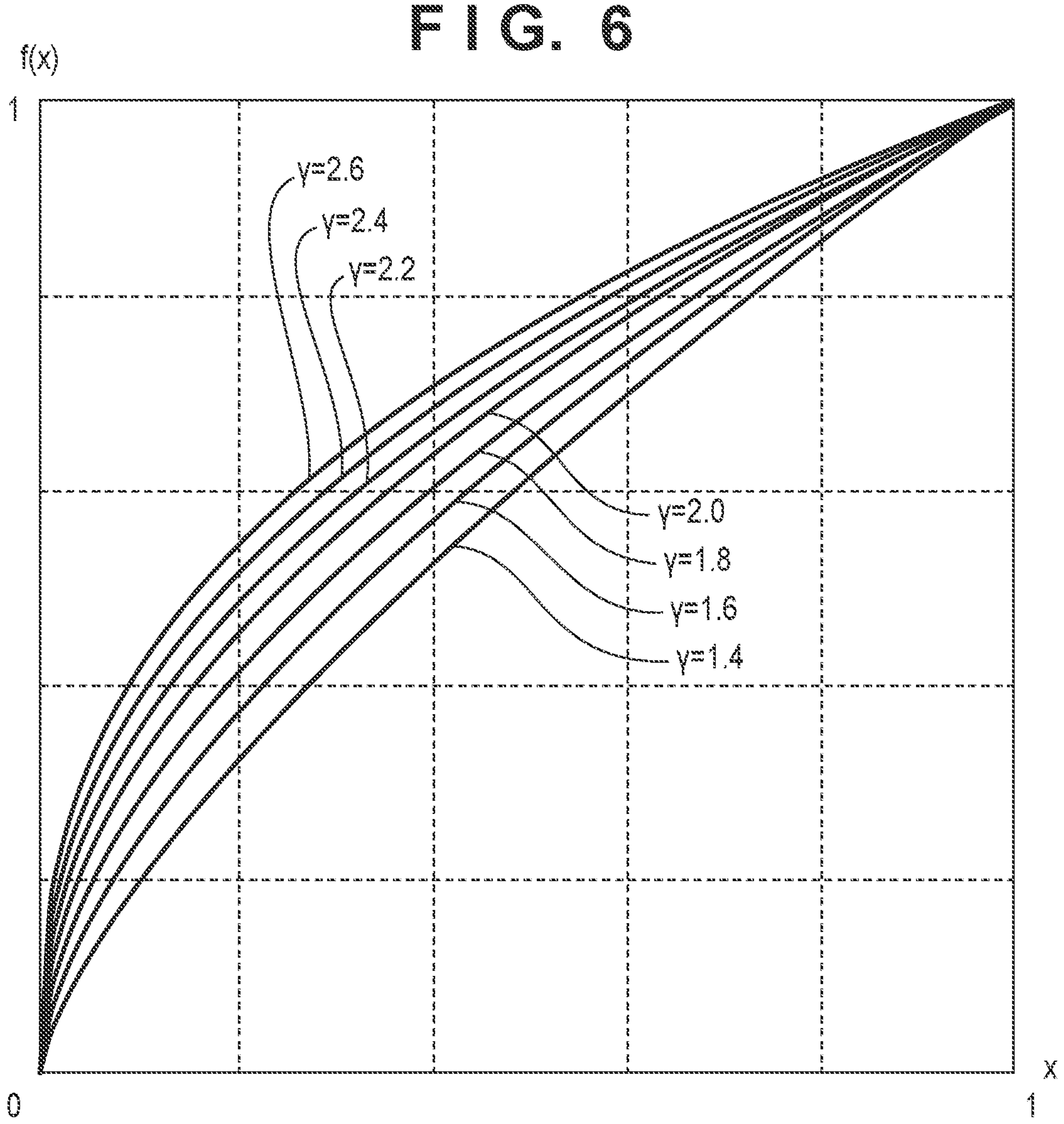
FIG. 6 is a graph for explaining gamma correction in an inference processing operation of the second embodiment.

Hereinafter, an inference processing operation in the image capturing apparatus 100 will be described with reference to FIGS. 5 and 6. A series of operations that is illustrated in FIG. 5 is realized, for example, by the processor 106 controlling the respective units of the image capturing apparatus 100 by executing a program that is stored in the ROM 105. An operation by the image processing unit 104 may be realized by the processor 106 or another processor, such as a GPU (not illustrated), executing a program that is stored in the ROM 105. From step S3002 to step S3005, the processor 106 or the image processing unit 104 first executes processing similarly to the first embodiment to generate a second image.

In step S6001, the image processing unit 104 calculates the brightness of the second image for which an offset has been removed in step S3005. In the present embodiment, a description will be given using as an example a case where an average value of respective pixel values of the second image is calculated as the brightness; however, the brightness may be calculated from values for which each pixel value has been converted into a luminance.

In step S6002, the processor 106 refers to a first look-up table, which indicates a relationship between an average value of respective pixel values that are stored in the ROM 105 and a γ value for gamma correction. Then, based on the first look-up table, the processor 106 sets in the image processing unit 104 the γ value for gamma correction that accords with the average value of respective pixel values. In step S6003, the processor 106 refers to a second look-up table, which indicates a relationship between the average value of respective pixel values that are stored in the ROM 105 and a γ value for de-gamma correction. Then, based on the second look-up table, the processor 106 sets in the image processing unit 104 the γ value for de-gamma correction that accords with the average value of respective pixel values. In the present embodiment, a description has been given using as an example a case where the γ value (characteristic) for de-gamma correction that accords with the average value of respective pixel values is set; however, a configuration may be taken so as to set a characteristic for de-gamma correction that corresponds to the γ value for gamma correction that has been set in step S6002.

In step S6004, the processor 106 refers to a third look-up table, which indicates a relationship between the average value of respective pixel values that are stored in the ROM 105 and neural network parameters. Based on the third look-up table, the processor 106 sets, in the neural network in the image processing unit 104, neural network parameters that accord with the average value of respective pixel values. In the present embodiment, a description has been given using as an example a case where the network parameters that accord with the average value of respective pixel values are obtained; however, a configuration may be taken so as to set corresponding neural network parameters for each γ value for gamma correction. For example, by referring to a look-up table in which neural network parameters are associated with γ values for gamma correction that vary stepwise, neural network parameters that correspond to the γ value that has been set in step S6002 may be set in the image processing unit 104.

Similarly to the first embodiment, the processor 106 further executes step S3006 to step S3013, performs de-gamma processing and the like on the eighth image, which has been generated by the neural network, and then generates the tenth image. After generating the tenth image, the processor 106 terminates the processing.

Here, characteristics of gamma correction to be applied in the present embodiment will be described with reference to FIG. 6. In FIG. 6, a horizontal axis represents a value of a pixel before gamma correction and a vertical axis represents a pixel value after gamma correction. In FIG. 6, gamma curves for when γ is 2.6, 2.4, 2.2, 2.0, 1.8, 1.6, and 1.4 in the above Equation (1) are drawn. In the present embodiment, in the operation from step S6001 to step S6004, a particular gamma curve that corresponds to an average value of respective pixel values is associated. For example, if an average value of the respective pixel values of an image are lower than a predetermined threshold for low luminance, the processor 106 selects a gamma curve (characteristic) of γ=2.6. This makes it possible to obtain a gamma correction result in which many tones are allocated to pixel values of a low luminance region before gamma correction, and thereby when normalization is canceled so as to result in 8 bits in step S3008, it becomes possible to maintain tones of pixels in the low luminance region. If the average value of the respective pixel values of an image are higher than a predetermined threshold for high luminance, the processor 106 selects a gamma curve (characteristic) of γ=1.4. This makes it possible to obtain a gamma correction result in which many tones are allocated to pixel values of a high luminance region before gamma correction in comparison to other gamma curves. Thereby when normalization is canceled so as to result in 8 bits in step S3008, it becomes possible to maintain tones of pixels in the high luminance region.

<Training Processing Operation in Image Processing System>

Figure 12:
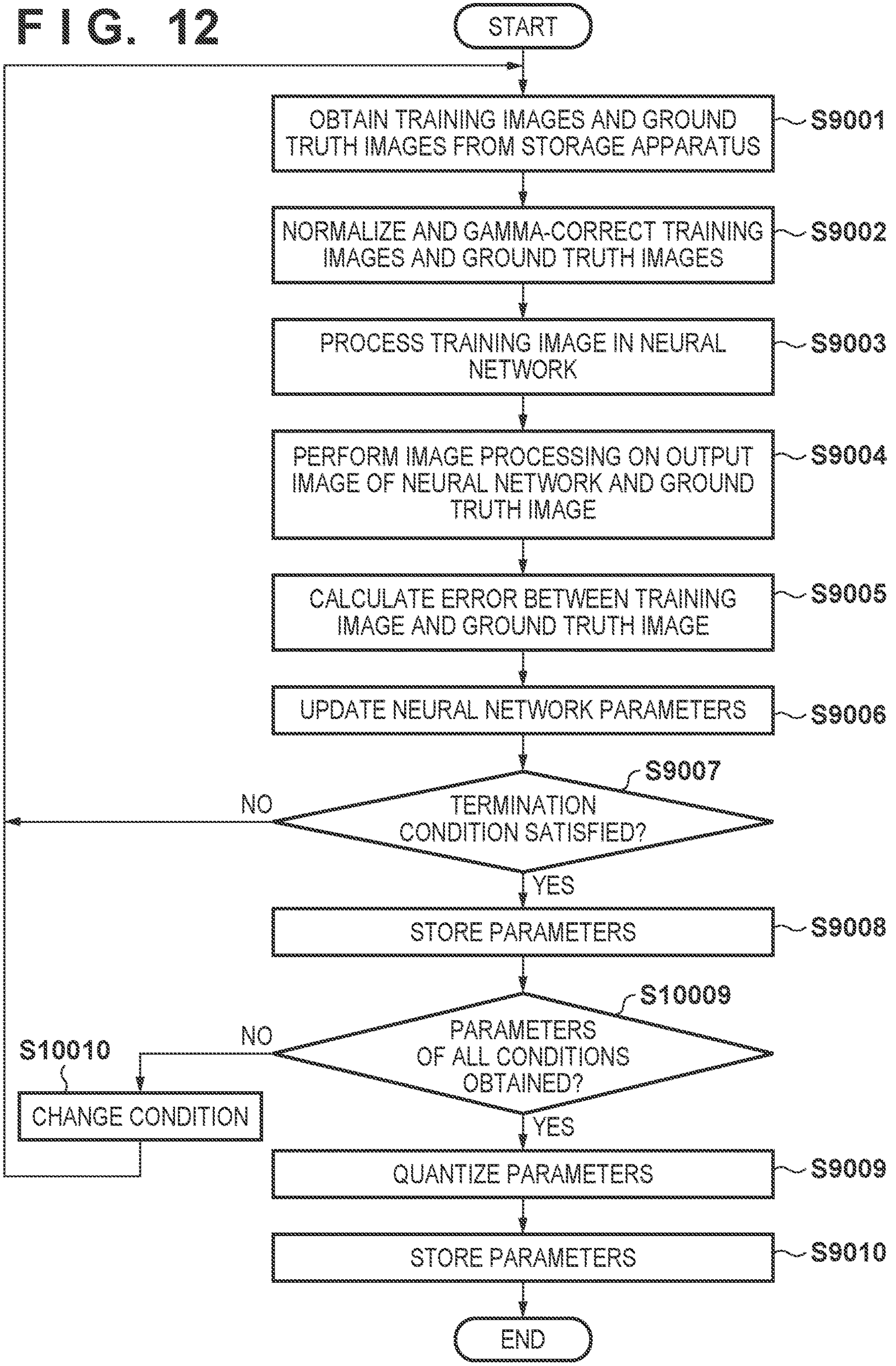
FIG. 12 is a flowchart for explaining a training processing operation of the second embodiment.

Next, a training processing operation in the image processing system (the image capturing apparatus 200, the image processing apparatus 210, the display apparatus 220, and the storage apparatus 230) according to the second embodiment will be described with reference to FIG. 12. A series of operations that is illustrated in FIG. 12 is realized by the processor 206 of the image processing apparatus 210 controlling the respective units (the image processing unit 204, the GPU 213, and the like) of the image processing apparatus 210 by deploying and executing in the RAM 207 a program that is stored in the ROM 205. The operation by the image processing unit 204 may be realized by the GPU 213 executing a program that is stored in the ROM 205. Similarly to the first embodiment, the processor 206 or the image processing unit 204 first performs processing from step S9001 to step S9008.

In step S10009, the processor 206 determines whether neural network parameters of all conditions (e.g., that it corresponds to average values of respective pixel values that have been provided stepwise) have been obtained. By matching a condition of the operation of switching network parameters in step S6004 of the inference processing with a condition of the training processing operation, it becomes possible to improve the inference precision of noise reduction processing at the time of inference. Therefore, in a case where image processing is performed under a plurality of conditions (or conditions are switched) at the time of inference, there is an advantage in having network parameters for each condition. If the processor 206 determines that network parameters of all conditions have been obtained, the processor 206 proceeds to step S9009. Meanwhile, if the processor 206 determines that network parameters of all conditions have not been obtained, the processor 206 proceeds to step S10010 and changes the condition. The processor 206 then returns the processing to step S9001 and performs the above-described processing again. The network parameters are stored in a parameter storage region by condition. The parameter storage region may be the ROM 205 or the RAM 207. The network parameters that have been stored in the parameter storage region may be stored as necessary in the storage apparatus 230. The processor 206 also executes steps S9009 and S9010 in the same manner as in FIG. 10.

As described above, in the present embodiment, a configuration has been taken so as to compress tones using a gamma correction characteristic that accords with to the brightness of an image among a plurality of gamma correction characteristics that vary stepwise. A configuration has also been taken so as to perform image processing (such as noise reduction processing) using different network parameters that accord with the brightness of the image among a plurality of sets of network parameters of a neural network that have been trained in advance. A configuration has also been taken so as to decompress tones of image data using a characteristic that accords with the brightness of the image among a plurality of de-gamma correction characteristics that decompress tones. A configuration has also been taken so as to obtain and store optimum network parameters for each condition (e.g., for each brightness of the image) in the training processing. This makes it possible to obtain a neural network in which inference precision is less likely to be affected even for image processing that is affected by a change in a condition, such as brightness of an image.

In the above-described example, a description has been given using as an example a neural network that reduces noise of an image. However, regarding processing that is other than noise reduction, similarly by simulation, a training processing operation can be executed by preparing a pair of a training image and a ground truth image. In super-resolution, it is possible to prepare a training image by downsampling a ground truth image. At this time, sizes may be or may not be matched between the ground truth image and the training image. In a case of out-of-focus blur removal and shake blur removal (deburring), it is possible to generate a training image by applying a blur function to a ground truth image. In a case of white balance correction, an image whose white balance is not appropriately adjusted or corrected may be used as a training image for a ground truth image in which image capturing has been performed with appropriate white balance. The same applies to color correction, such as color matrix correction. In a case of missing data interpolation, it is possible to obtain a training image by causing a ground truth image to lose data. In a case of demosaicing, a ground truth image may be prepared using a three-plate-type image capturing element or the like, and a training image may be generated by resampling the ground truth image in a Bayer array or the like. In inference of color components, it is possible to generate a training images by reducing color components in a ground truth image. Regarding dehazing, it is possible to generate a training image by adding scattered light by simulation of a physical phenomenon to a ground truth image without fog or the like. In a case where a plurality of frames continue, such as in a moving image, when a desired number of frames are inputted to a neural network, collectively in a depth direction, it is possible to remove noise more effectively.

In the present embodiment, a description has been given using as an example a case where a γ value that corresponds to brightness is uniquely selected using a look-up table. However, there are cases where if the γ value is changed greatly, the change in a luminance of an image to be outputted becomes large, resulting in an image that is difficult to see. Therefore, a configuration may be taken so as to, rather than uniquely selecting a γ value that accords with brightness using a look-up table, change, in accordance with brightness, from a current γ value to a neighboring γ value that is stored in the ROM 205. That is, among a plurality of gamma correction γ values (characteristics) that vary stepwise and are included in the look-up table as illustrated in FIG. 6, a γ value (e.g., 2.4 or 2.0) that is adjacent to a current γ value (e.g., 2.2) is selected. In this case, the γ value is changed to a target γ value over time without greatly changing at once. In addition, in this case, by referring to a look-up table in which neural network parameters are associated with each gamma value, it becomes possible to set corresponding neural network parameters when the above neighboring gamma value is set. In addition, regarding de-gamma correction, de-gamma correction can be carried out using a de-gamma correction characteristic that corresponds to the above neighboring γ value among de-gamma correction characteristics that vary stepwise. In addition, in the present embodiment, the digital gain is applied before input into a neural network; however, the digital gain may be applied after processing by the neural network. In such a case, regarding the respective neural networks, those that have been appropriately trained with images before a digital gain is applied are prepared.

Third Embodiment

Next, a description will be given for a third embodiment. In the second embodiment, the brightness of the second image is obtained, and the gamma correction value is set based on the obtained brightness. The third embodiment is different from the second embodiment in that brightness is obtained for each region of the second image and a gamma correction value is set based on the brightness of a region. However, examples of the configuration of the image capturing apparatus 100 and the functional configuration of the image processing system may be substantially the same as those of the first embodiment. Therefore, the same reference numerals are assigned to configurations and processing that are substantially the same, descriptions thereof will be omitted, and a description will be given mainly on points of difference.

<Inference Processing Operation in Image Capturing Apparatus 100>

Figure 7:
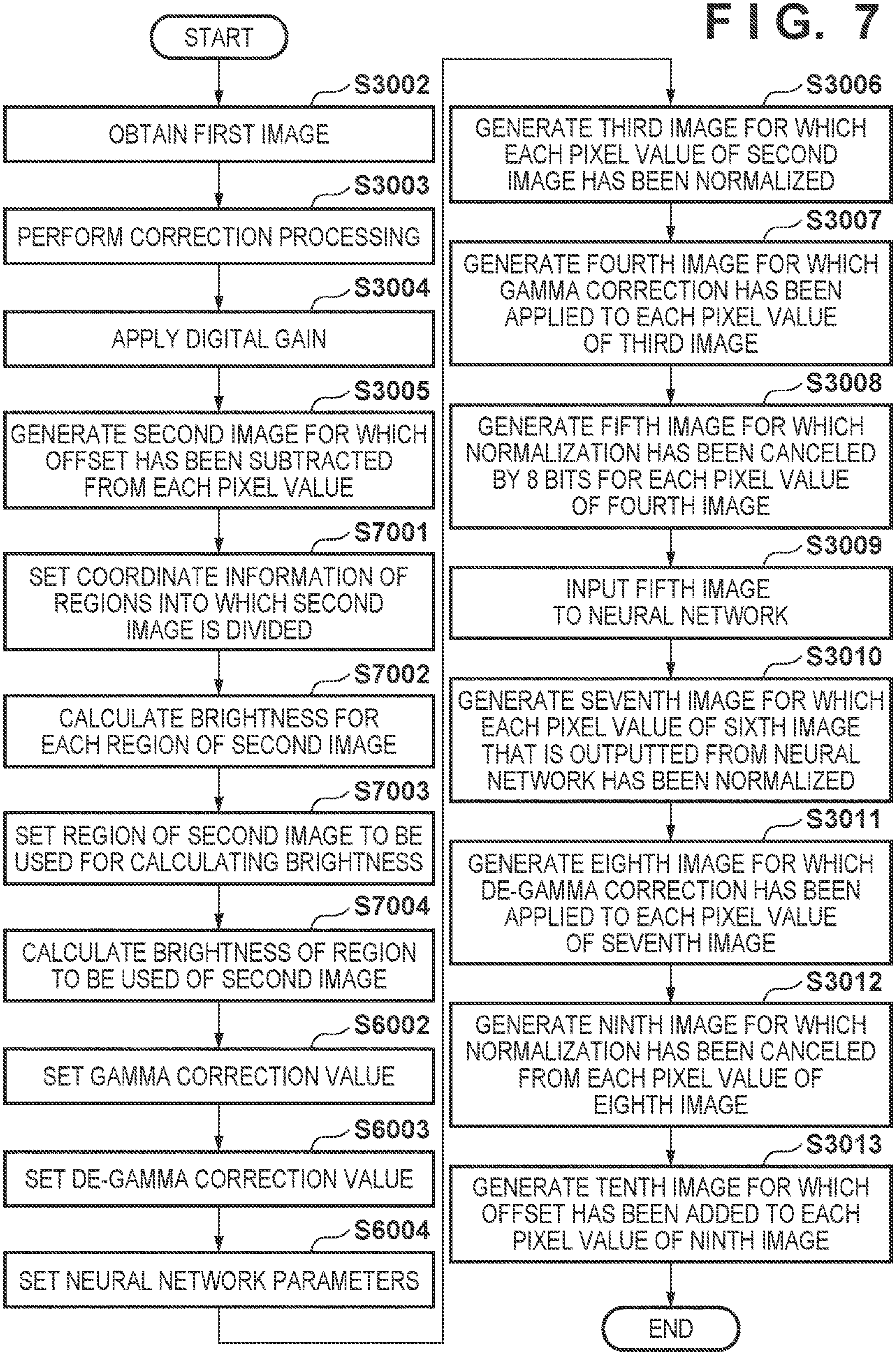
FIG. 7 is a flowchart for explaining an inference processing operation of a third embodiment.

An inference processing operation in the image capturing apparatus 100 will be described with reference to FIG. 7. A series of operations that is illustrated in FIG. 7 is realized, for example, by the processor 106 controlling the respective units of the image capturing apparatus 100 by executing a program that is stored in the ROM 105. An operation by the image processing unit 104 may be realized by the processor 106 or another processor, such as a GPU (not illustrated), executing a program that is stored in the ROM 105. The processor 106 or the image processing unit 104 first executes processing from step S3002 to step S3005 similarly to the second embodiment (FIG. 5) to generate a second image.

In step S7001, the processor 106 obtains coordinate information for region division for calculating brightness for each region, which is stored in the ROM 105. Then, based on that coordinate information for region division, the processor 106 sets in the image processing unit 104 the coordinates of divisional regions for the second image. When an upper left corner pixel of an image is set as a coordinate origin (X, Y)=(0, 0) of the image, for example, the coordinate information for region division may be configured by start point coordinates (X, Y) and end point coordinates (X, Y) for each region based on a coordinate origin. Alternatively, the coordinate information for region division may be configured by the start point coordinates (X, Y) and a width and a height of a region for each region. The processor 106 may also calculate the coordinate information for region division from width and height information of the second image and information of the number of divisions in an X direction and the number of divisions in a Y direction.

Figure 8:
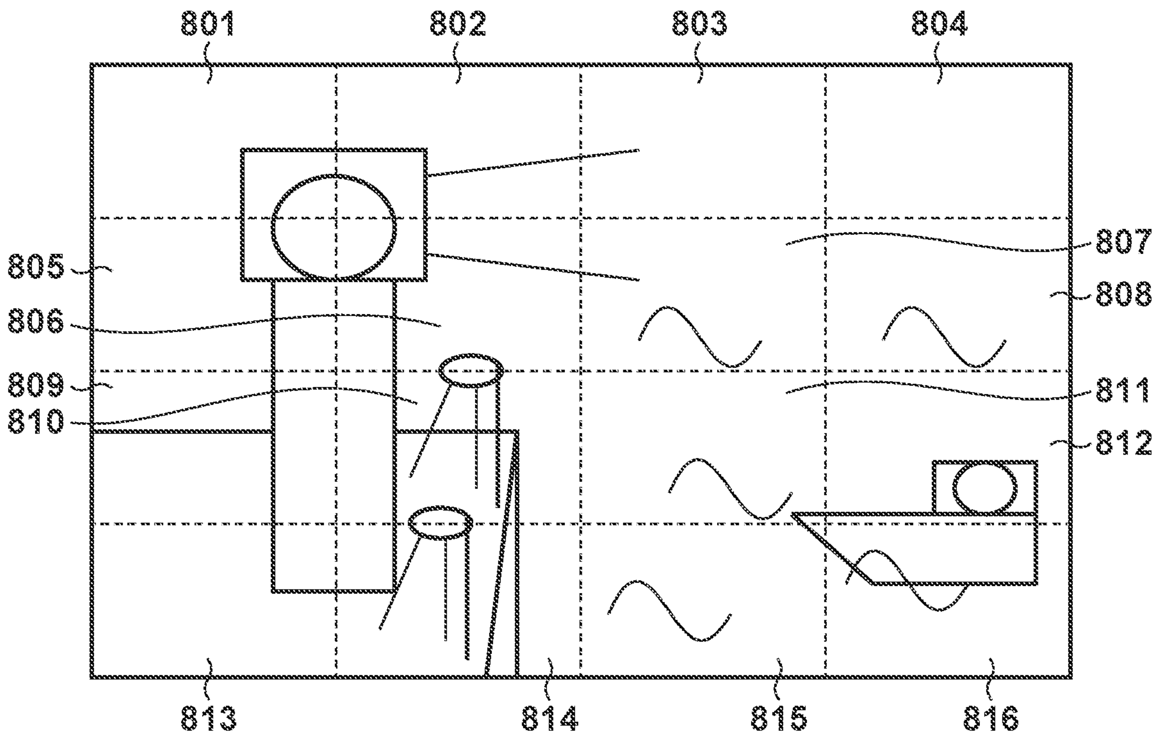
FIG. 8 is a diagram conceptually illustrating region division of the third embodiment.

For example, in the present embodiment, a description will be given using as an example a case where the second image is divided into a total of 16 regions (regions 801 to 816) by dividing it into four divisions each in the X direction and the Y direction, as illustrated in FIG. 8. FIG. 8 schematically illustrates an example of an image that includes a dark sea and light, such as a lighthouse and an electric lamp, which has been captured by an image capturing apparatus 100 for port monitoring and the like, for example. When a characteristic of gamma correction is set using the brightness of the entire image, it is affected by the light of the lighthouse and the electric lamp; however, it is desirable to obtain a tonality that accords with the dark sea. Therefore, in the present embodiment, the processing for obtaining the brightness of a region of the dark sea is performed according to the processing of steps S7002 to S7004.

Figure 9:
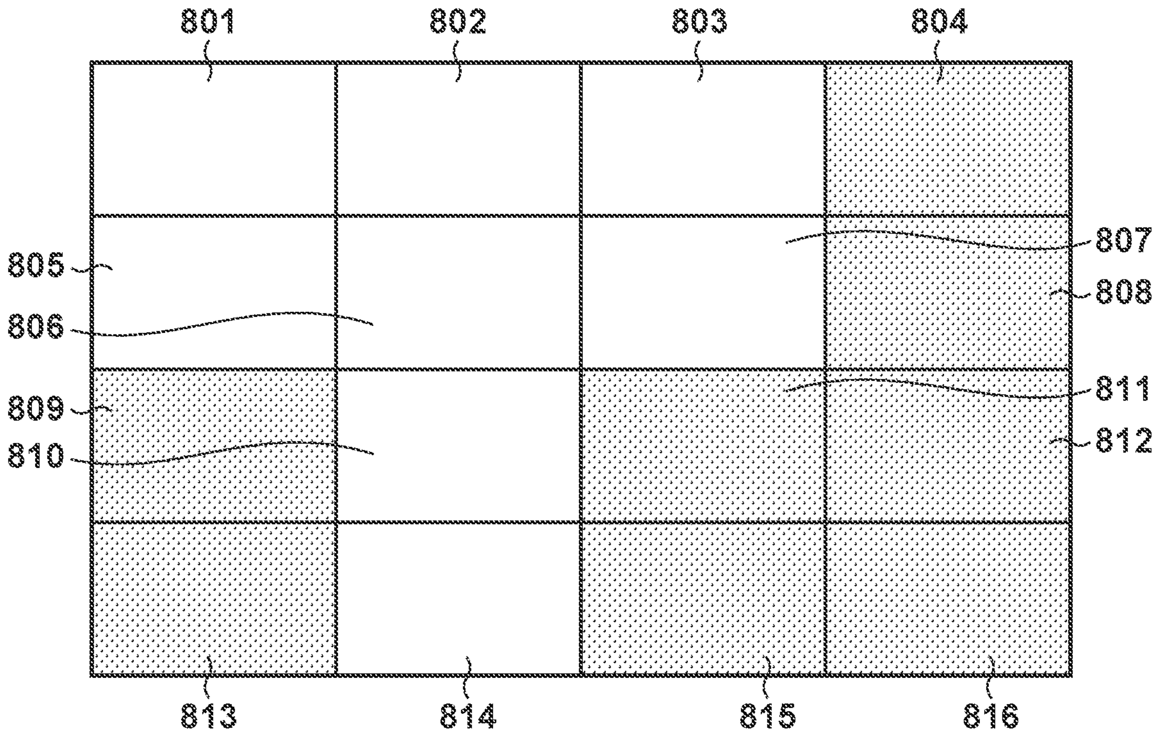
FIG. 9 is a diagram conceptually illustrating selection of a region of an image that has been divided into regions of the third embodiment.

In step S7002, the image processing unit 104 calculates the brightness for each region of the second image based on the coordinates of divisional regions that have been set in step S7001. In the present embodiment, a description will be given using as an example a case where an average value of respective pixel values for each region of the second image is calculated as brightness; however, the brightness may be calculated from values for which each pixel value has been converted into a luminance. In step S7003, the processor 106 sets in the image processing unit 104 a region of the second image based on a region selection condition that is stored in the ROM 105 (in accordance with the average value of respective pixel values for each region that has been calculated in step S7002). The region selection condition may be such that the user selects one or more arbitrary regions or such that one or more arbitrary regions are selected from the number of regions to be used and a priority of brightness and darkness of the average value of respective pixel values. Alternatively, one or more regions whose average value of respective pixel values is lower than a predetermined threshold may be selected. For example, a case where the region selection condition is that the number of regions to be used is eight and regions whose average value of respective pixel values is dark are prioritized will be considered. In this case, the processor 106 selects eight regions (regions 804, 808, 809, 811, 812, 813, 815 and 816) that are illustrated in FIG. 9 as the regions of the second image to be used in step S7004.

In the present embodiment, regions of the second image to be used in step S7004 are selected according to the above-described region selection condition; however, selection of a region is not limited to this. In a case where the image capturing apparatus 100 is used as a surveillance camera, for example, a region of an image may be selected as follows. For example, a region of the second image to be used may be selected for each time of day based on time information and brightness information for each region of the previous day and days before. In this case, the brightness for each region to be used is also calculated, and if a difference from the brightnesses of the same region of the previous day and days before is greater than a predetermined value, it may be determined to be a special condition, which is different from that of the previous day and days before, and the region to be used may be changed. In other words, a region in which a difference from the brightnesses of the same region of the previous day and days before is less than or equal to a predetermined value is selected. In addition, the brightness for each region to be used may be calculated, and if a difference between a change in brightness from that of the same region that has been last calculated and changes in brightness in the same region and the same time of day of the previous day and days before is greater than a predetermined value, it may be determined to be a special condition that is different from that of the previous day and days before, and the region to be used may be changed. For example, in a case where, during the time of day from sunset to during the night, it is dark in the same region at the same time of day of the previous day and days before but brightness in the same region at the same time of day of today is greater than or equal to a predetermined threshold, it can be thought that an illumination has been turned on or a lit illumination has approached. By the above-described processing, it can be determined that such a region is not suitable as a region for selecting a characteristic of the gamma correction.

In step S7004, the image processing unit 104 calculates the brightness for each region of the second image that has been set in step S7003. The brightness may be calculated by dividing a sum of average values of respective pixel values for each region to be used by the number of regions to be used. In addition, the average values of respective pixel values for each region to be calculated in step S7002 may be held in the RAM 107, only the average values of respective pixel values of regions to be used may be read out, and that sum may be divided by the number of regions to be used.

The image processing unit 104 then executes the operation from step S6002 to step S3013 as described in FIG. 5 and terminates the series of processes after the processing of step S3013.

As described above, in the present embodiment, brightness is calculated for each predetermined region in an image, and gamma correction that corresponds to the calculated brightnesses and a corresponding neural network are applied. This makes it possible to, in addition to the effects of the above-described embodiments, allocate many tones in a dark region in an image in a case where processing an image in which a difference in brightness and darkness is large for each region.

In the above description, a description has been given using as an example the processing for calculating in the apparatus the brightness of an image or a region of an image; however, a configuration may be taken so as to, rather than calculate the brightness, obtain a value from a look-up table or a value that has been calculated by an external apparatus.

Fourth Embodiment

Next, a description will be given for a fourth embodiment. In the fourth embodiment, image processing by the neural network is performed after tone correction that accords with a setting of an image to be outputted has been applied to the image. Examples of the configuration of the image capturing apparatus 100 and the functional configuration of the image processing system may be substantially the same as those of the first embodiment. Therefore, the same reference numerals are assigned to configurations and processing that are substantially the same, descriptions thereof will be omitted, and a description will be given mainly on points of difference.

<Inference Processing Operation in Image Capturing Apparatus 100>

Figure 13A:
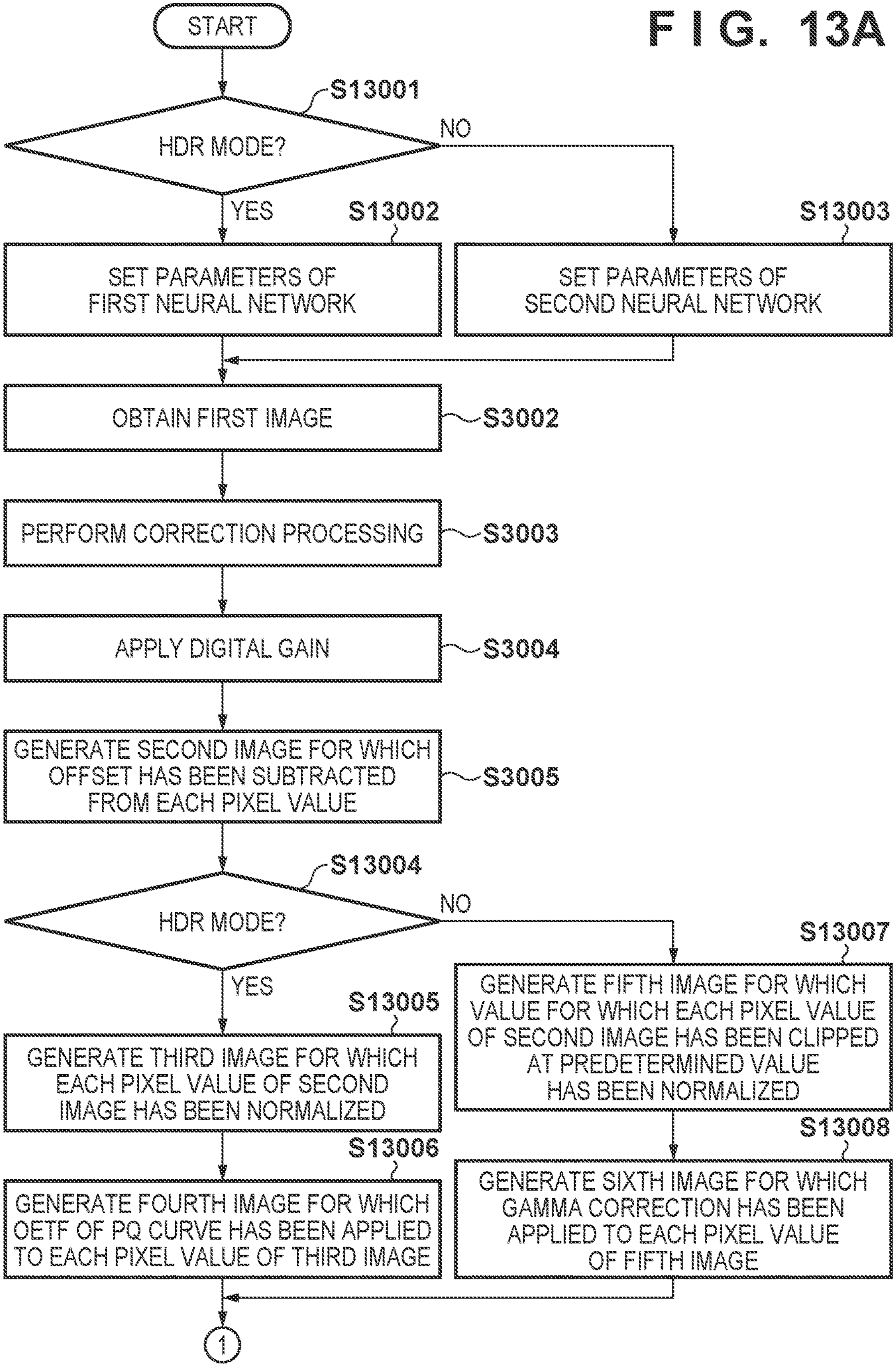
FIG. 13A is a flowchart (1) for explaining an inference processing operation of the fourth embodiment.
Figure 13B:
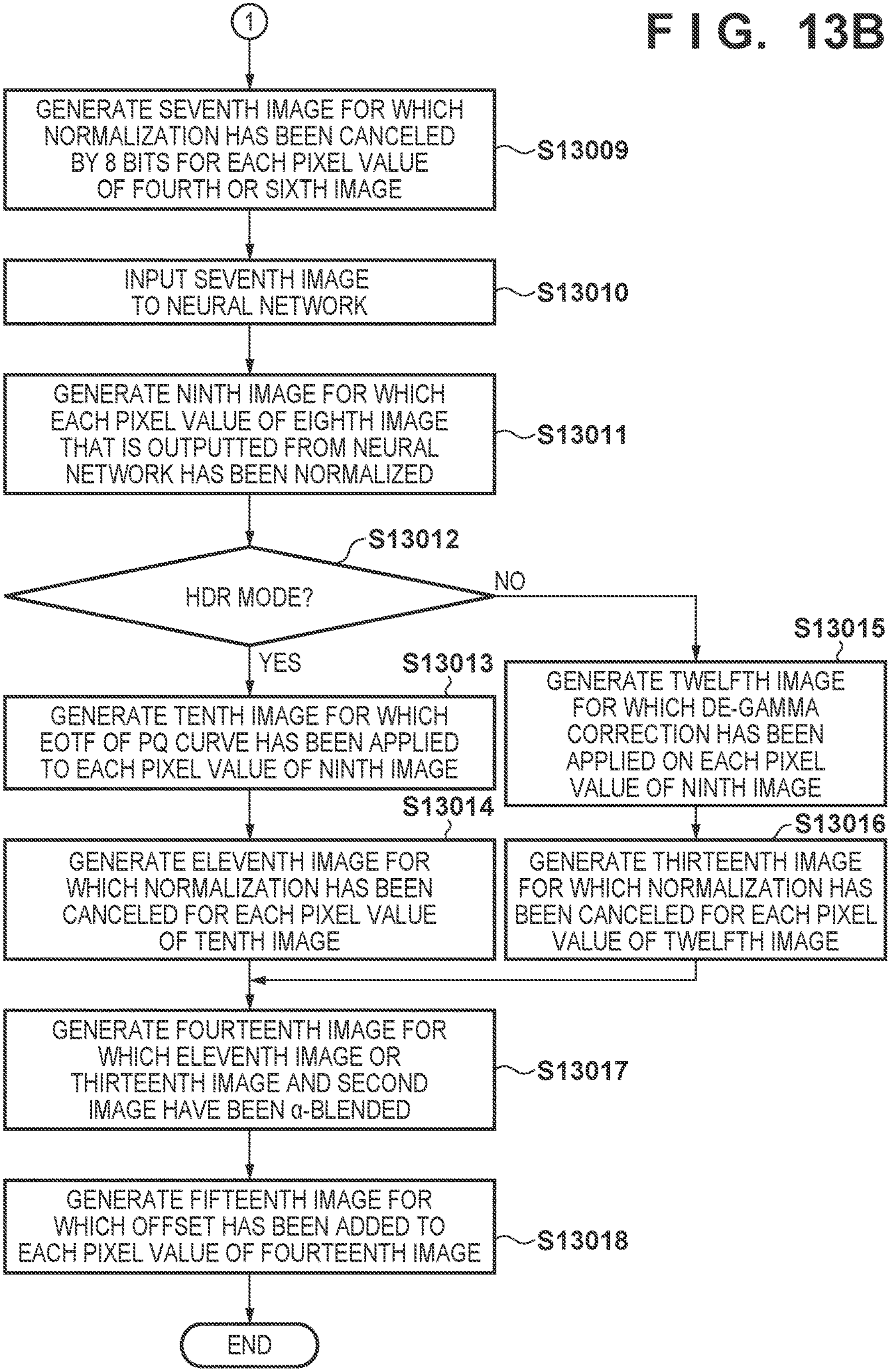
FIG. 13B is a flowchart (2) for explaining an inference processing operation of the fourth embodiment.

An inference processing operation in the image capturing apparatus 100 will be described with reference to FIGS. 13A and 13B. A series of operations that is illustrated in FIGS. 13A and 13B is realized, for example, by the processor 106 controlling the respective units of the image capturing apparatus 100 by executing a program that is stored in the ROM 105. An operation by the image processing unit 104 may be realized by the processor 106 or another processor, such as a GPU (not illustrated), executing a program that is stored in the ROM 105.

First, in step S13001, the processor 106 determines whether an output mode of an image that is set in the image capturing apparatus 100 is a high dynamic range (HDR) mode or a standard dynamic range (SDR) mode. The processor 106 determines whether the output mode of an image is the HDR mode or the SDR mode, for example, by referring to a setting value that is stored in the RAM 107, and the like. If the processor 106 determines that the set output mode of an image is the HDR mode, the processor 106 advances the processing to step S13002, and if not, the processor 106 advances the processing to step S13003. In the present embodiment, a description will be given using as an example a case where a setting of an image to be outputted indicates whether an image to be outputted from the image capturing apparatus 100 is HDR or SDR, for example. However, the setting of an image to be outputted is not limited to this. For example, it may be a setting that indicates whether an image to be outputted by a series of processes is HDR or SDR.

In step S13002, the processor 106 sets, in a neural network in the image processing unit 104, parameters of a first neural network that are stored in the ROM 105. Here, the first neural network is a neural network that is optimized for input that corresponds to an HDR image whose number of tones is, for example, 1024 tones. In step S13003, the processor 106 sets, in a neural network in the image processing unit 104, parameters of a second neural network that are stored in the ROM 105. Here, the second neural network is a neural network that is optimized for input that corresponds to an SDR image whose number of tones is smaller than that of an HDR image (e.g., 256 tones). In the present embodiment, a description will be given using as an example a case where a neural network is set in accordance with a setting for the number of tones of an image to be outputted. However, a neural network may be set in accordance with a setting for a maximum value (or an upper limit value) of a luminance of an image to be outputted. In the present embodiment, a description will be given using as an example a case where a neural network that is associated with a respective output mode of an image is set. However, when both HDR and SDR can be processed by one neural network, the determination processing of step S13001 does not need to be performed. Next, the processing from step S3002 to step S3005 is performed in the same manner as in the above-described embodiments.

In step S13004, the processor 106 determines, similarly to step S13001, whether the set output mode of an image is the HDR mode or the SDR mode. If the processor 106 determines that the output mode of an image is the HDR mode, the processor 106 advances the processing to step S13005, and if not, the processor 106 advances the processing to step S13007.

In step S13005, the image processing unit 104 generates a third image for which each pixel value of the second image has been normalized. In an example of the present embodiment, a description will be given using as an example a case where, while each pixel value of the first image that has been obtained from the image capturing element 102 in step S3002 is 14 bits, each pixel value of the image that has been generated by applying a digital gain in step S3004 is handled in 18 bits, for example. The normalization of this step is processing in which each pixel value of 18 bits is associated with a range from 0 to 1, and the image processing unit 104 divides each pixel value by 2 to the power of 18. The calculation result is handled in a float32 format, which includes digits after the decimal point, or the like.

In step S13006, the image processing unit 104 generates a fourth image for which an opto-electronic transfer function (OETF) of a PQ curve has been applied to each pixel value of the third image. That is, the image processing unit 104 compresses tones of the third image by applying the OETF of the PQ curve to each pixel value of the third image. Although the OETF will be described later with reference to FIG. 14B, the OETF includes a characteristic that the lower the brightness, the more tones it is allocated. The OETF also includes a characteristic that many tones are allocated in a predetermined low luminance region than in a characteristic of gamma correction that is applied to an image in the SDR mode (which will be described later in step S13008). That is, in a setting of the output mode of an image, the image processing unit 104 uses the characteristic in which more tones are allocated in the predetermined low luminance region for a setting for which the number of bits representing a pixel value of an image to be processed is greater.

The PQ curve is tone values that conform to an electro-optical transfer function that is specified in Radiocommunication Sector of ITU (ITU-R) BT.2100.

Figure 14A:
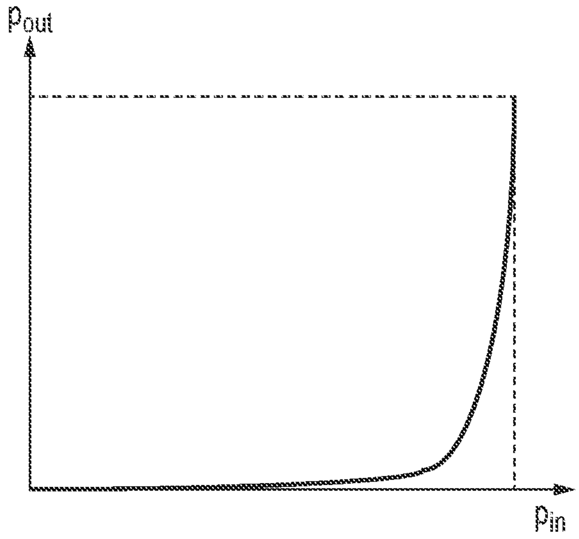
FIGS. 14A and 14B are diagrams for explaining an EOTF and an OETF according to the fourth embodiment.

The PQ curve will be described with reference to FIGS. 14A and 14B. FIG. 14A illustrates an example of the PQ curve (EOTF). The EOTF corresponds to a function that converts a tone value (luminance tone value), which is an image signal, into a luminance of a light output. Specifically, the EOTF of FIG. 14A is expressed by the following Equation 4. $p_{in}$ is an input value of the EOTF and is a value for which tone values (an R value, a G value, a B value, and the like) have been normalized to 0.0 to 1.0. $p_{in}=1.0$ corresponds to an upper limit of a tone value (an upper limit according to the number of bits), and $p_{in}=0.0$ corresponds to a lower limit of a tone value. For example, when the number of bits of a tone value is 10 bits, the upper limit of a tone value is 1023, and the lower limit of a tone value is 0. $p_{out}$ is an output value of the EOTF and is a tone value for which tone values (an R value, a G value, a B value, and the like), which are proportional to luminance, have been normalized to 0.0 to 1.0. For example, $p_{out}=0.0$ corresponds to 0 nit and $p_{out}=1.0$ corresponds to 100000 nits. max[x, y] is a function that outputs a greater value between x and y.

[EQUATION 4]

$$p_{out} = \left( \frac{\max\left[\left(p_{in}^{1/m_2} - c_1\right), 0\right]}{c_2 - c_3 \cdot p_{in}^{1/m_2}} \right)^{1/m_1} \tag{4}$$

$m_1 = 0.1593017578125,\ m_2 = 78.84375,$ $c_1 = 0.8359375,\ c_2 = 18.8515625,\ c_3 = 18.6875$

Figure 14B:
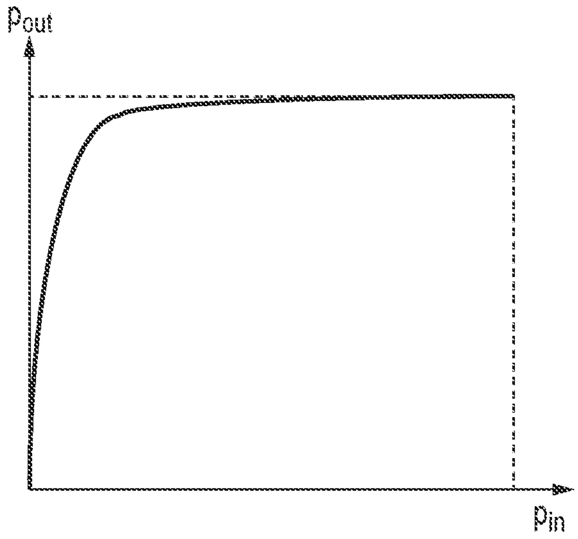

FIG. 14B illustrates an example of the OETF, which includes a characteristic that is truly opposite to that of the EOTF of FIG. 14A. The OETF corresponds to a function which converts luminance to a tone value of an image signal. Specifically, the OETF of FIG. 14B is expressed by the following Equation 5. $q_{in}$ is an input value of the OETF and is a tone value for which tone values (an R value, a G value, a B value, and the like), which are proportional to luminance, have been normalized to 0.0 to 1.0. For example, $q_{in}$=0.0 corresponds to 0 nit and $q_{in}$=1.0 corresponds to 10000 nits. $q_{out}$ is an output value of the OETF and is a value for which tone values (an R value, a G value, a B value, and the like) have been normalized to 0.0 to 1.0. $q_{out}$=1.0 corresponds to an upper limit of a tone value (an upper limit according to the number of bits), and $q_{out}$=0.0 corresponds to a lower limit of a tone value. For example, when the number of bits of a tone value is 10 bits, the upper limit of a tone value is 1023, and the lower limit of a tone value is 0.

[EQUATION 5]

$$q_{out} = \left( \frac{c_1 + c_2 \cdot q_{in}^{m_1}}{1 + c_3 \cdot q_{in}^{m_1}} \right)^{m_2} \tag{5}$$

$m_1 = 0.1593017578125,\ m_2 = 78.84375,$ $c_1 = 0.8359375,\ c_2 = 18.8515625,\ c_3 = 18.6875$

In step S13007, the image processing unit 104 performs processing for clipping each pixel value of the second image that has been generated in step S3005 at a predetermined value (e.g., a pixel value that is greater than or equal to a predetermined value is set as a predetermined value) and generates a fifth image for which a processed value has been normalized. The predetermined value is, for example, an upper limit of a dynamic range that is sufficient for SDR. For example, the image processing unit 104 clips at 16383, which is 14 bits. In the normalization in this step, to normalize each pixel value of 14 bits to a range from 0 to 1, the image processing unit 104 divides each pixel value by 2 to the power of 14. The calculation result is handled in a float32 format, which includes digits after the decimal point, or the like. In step S13008, the image processing unit 104 generates a sixth image for which gamma correction has been applied to each pixel value of the fifth image. The gamma correction here is the same processing as that of the above-described step S3007.

In step S13009, the image processing unit 104 generates a seventh image for which normalization has been canceled so as to result in 8 bits for each pixel value of the fourth image, which has been generated in step S13006, or the sixth image, which has been generated in step S13008. The cancelation of normalization in this step is the same processing as that of the above-described step S3008. In step S13010, the image processing unit 104 inputs the seventh image to the neural network. The neural network that is used in this step is the first or second neural network that has been set in step S13002 or step S13003 and is a neural network that performs noise reduction on an image. That is, in the present embodiment, a neural network is applied using different parameters among parameters of a plurality of pretrained neural networks in accordance with a setting of the output mode of an image.

In step S13011, the image processing unit 104 generates a ninth image for which each pixel value of the eighth image that is outputted from the neural network has been normalized. The normalization in this step is the same processing as that of step S3010. In step S13012, the processor 106 determines, similarly to step S13001, whether the set output mode of an image is the HDR mode or the SDR mode. If the processor 106 determines that the output mode of an image is the HDR mode, the processor 106 advances the processing to step S13013, and if not, the processor 106 advances the processing to step S13015.

Since the output mode of an image is the HDR mode, in step S13013, the image processing unit 104 generates a tenth image for which the EOTF of the PQ curve has been applied to each pixel value of the ninth image. In step S13014, the image processing unit 104 generates an eleventh image for which normalization has been canceled by 18 bits for each pixel value of the tenth image. In the cancelation of normalization in this step, to cancel normalization so as to result in 18 bits, the image processing unit 104 multiplies each pixel value by 2 to the power of 18. The calculation result is handled in 18 bits.

Since the output mode of an image is the SDR mode, in step S13015, the image processing unit 104 generates a twelfth image for which de-gamma correction has been applied to each pixel value of the ninth image. The processing for de-gamma correction in this step is the same processing as that of step S3011. In step S13016, the image processing unit 104 generates a thirteenth image for which normalization has been canceled by 14 bits for each pixel value of the twelfth image. The cancelation of normalization in this step is the same processing as that of step S3012. In the present embodiment, tones of image data are thus decompressed using different characteristics among a plurality of characteristics for decompressing tones (characteristics of the EOTF and de-gamma correction) in accordance with the setting of the output mode of an image.

In step S13017, the image processing unit 104 generates a fourteenth image for which the eleventh image, which has been generated in step S13014, or the thirteenth image, which has been generated in step S13016, and the second image have been α-blended. The α blending is for compositing two images based on weights (α values) that have been set for each pixel. The image processing unit 104 executes a blending in accordance with pixel values of an inputted image. The image processing unit 104 multiplies the second image by a coefficient (1-α), multiplies the eleventh image or the thirteenth image by a coefficient α, and then adds the results after the multiplication. The α value at this time is linearly converted between 0 and 1 in accordance with a size of a pixel value. However, this a blending does not necessarily need to be performed.

In step S13018, the image processing unit 104 generates a fifteenth image for which an offset has been added to each pixel value of the fourteenth image. After generating the fifteenth image, the processor 106 terminates the series of processes. In the present embodiment, a configuration has been taken so as to apply the OETF of the PQ curve and gamma correction for tone compression. A configuration has also been taken so as to apply the EOTF of the PQ curve and de-gamma correction for tone decompression. However, another transfer function or conversion characteristic may be used for tone compression and tone decompression.

As described above, in the present embodiment, image processing by the neural network is performed after tone correction that accords with a setting of an image to be outputted has been applied to the image. This makes it possible to, while maintaining a required dynamic range in accordance with the setting (e.g., HDR or SDR) of an image to be outputted, perform processing of the neural network for which the number of bits is limited. A configuration has also been taken so as to α-blend an image after processing in which the neural network is used, using an image (e.g., the second image or the like) before processing in which the neural network is used. This makes it possible to restore information that has been lost due to reduction of bits.

In the present embodiment, a description has been given as an example a case where the setting of an image to be outputted is HDR or SDR (i.e., the number of tones of an image to be outputted varies). However, the setting of an image to be outputted may be a characteristic of compressing or decompressing tones of an image (e.g., the OETF/EOTF or the γ value). Alternatively, the setting of an image to be outputted may be the number of bits that represent a pixel value of an image to be outputted or an upper limit value of the pixel value.

In addition, in the present embodiment, a description has been given using as an example a case where a characteristic to be used for tone compression, parameters of a neural network, and a characteristic to be used for tone decompression are controlled in accordance with the setting of an image to be outputted. However, the characteristic to be used for tone compression, the parameters of the neural network, and the characteristic to be used for tone decompression may be controlled based on another information. For example, the characteristic to be used for tone compression and the like may be controlled based on the setting of an image to be inputted to the neural network. The setting of an image to be inputted to the neural network may be, for example, the number of bits that represent a pixel value of the image, the number of tones of the image, or an upper limit value of the pixel value of the image.

Fifth Embodiment

Furthermore, a description will be given for a fifth embodiment. In the fifth embodiment, tone processing and image processing by the neural network is performed after image data to be inputted has been clipped. Examples of the configuration of the image capturing apparatus 100 and the functional configuration of the image processing system may be substantially the same as those of the first embodiment. Therefore, the same reference numerals are assigned to configurations and processing that are substantially the same, descriptions thereof will be omitted, and a description will be given mainly on points of difference.

<Inference Processing Operation in Image Capturing Apparatus 100>

Figure 15A:
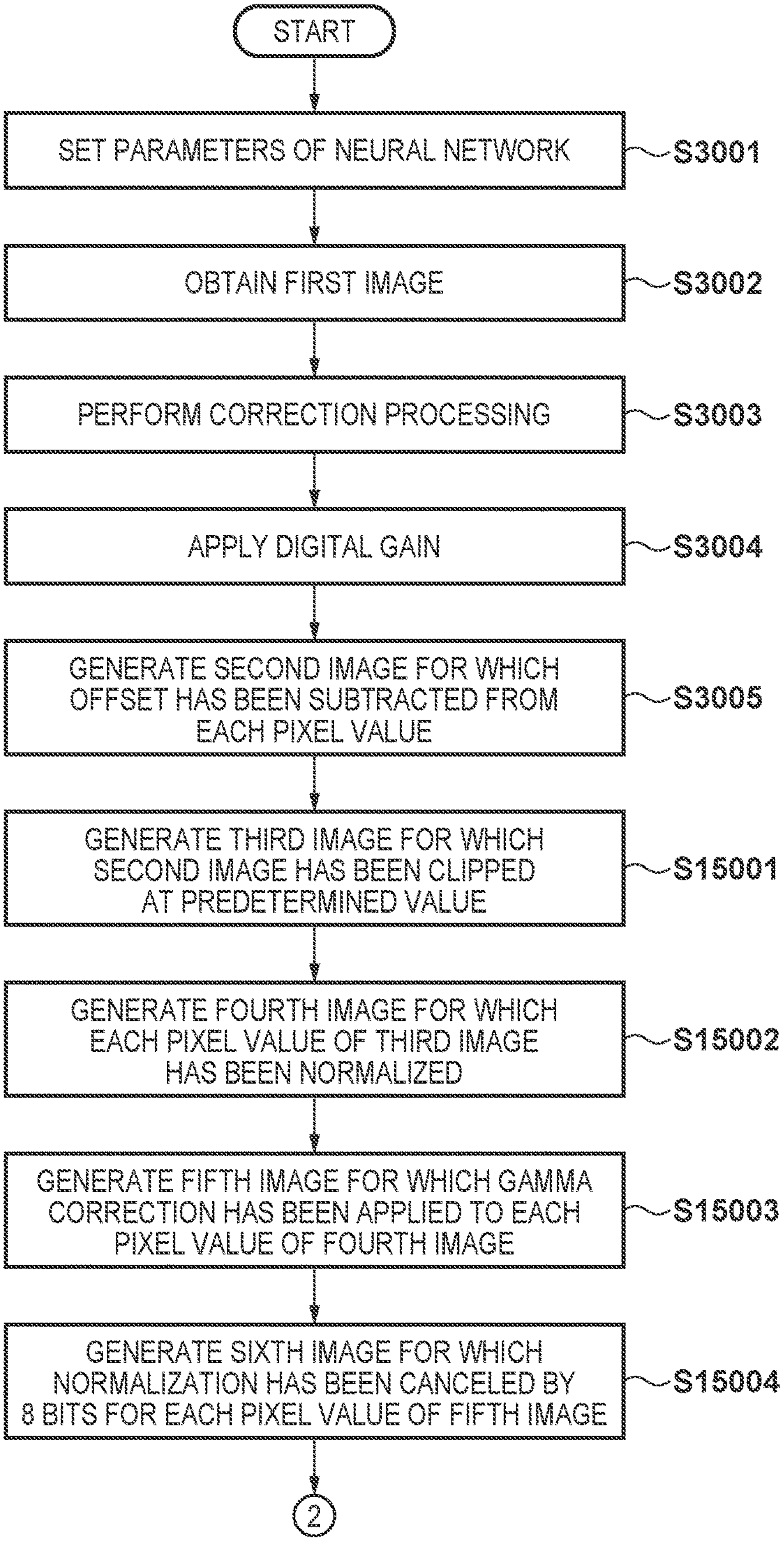
FIG. 15A is a flowchart (1) for explaining an inference processing operation of the fifth embodiment.
Figure 15B:
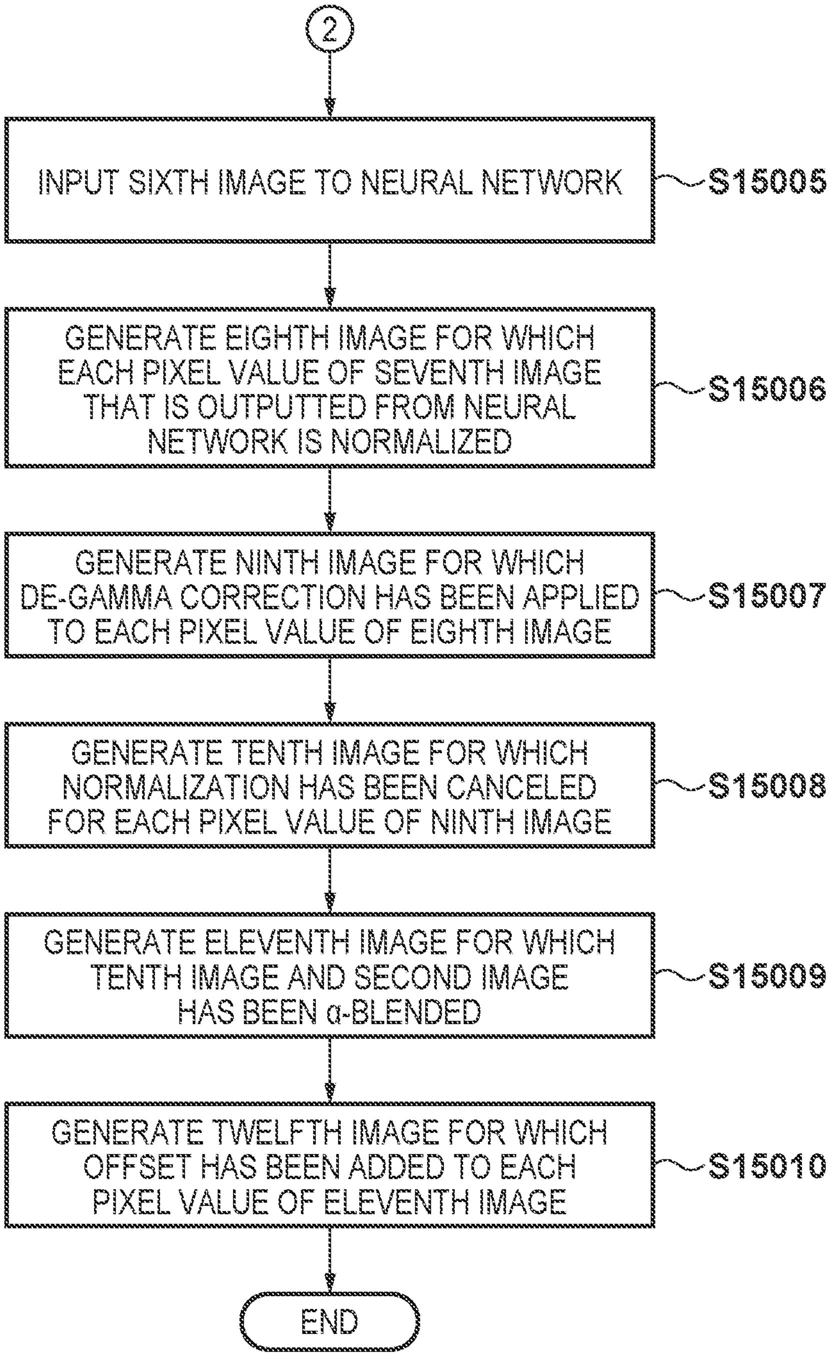
FIG. 15B is a flowchart (2) for explaining an inference processing operation of the fifth embodiment.

Inference processing to be performed in the image capturing apparatus 100 will be described with reference to FIGS. 15A and 15B. A series of operations that is illustrated in FIGS. 15A and 15B is realized, for example, by the processor 106 controlling the respective units of the image capturing apparatus 100 by executing a program that is stored in the ROM 105. An operation by the image processing unit 104 may be realized by the processor 106 or another processor, such as a GPU (not illustrated), executing a program that is stored in the ROM First, the processing from step S3001 to step S3005 is performed in the same manner as in the above-described embodiments, and setting of parameters of the neural network, generation of the second image for which an offset has been subtracted from pixel values of an image, and the like are performed.

Next, in step S15001, the image processing unit 104 generates a third image for which the pixel values of the second image have been clipped at a predetermined value (e.g., a pixel value that is greater than or equal to a predetermined value is set as a predetermined value). In the present embodiment, a description has been using as an example a case where an upper limit value of a pixel value is set to 10 bits and an image that has been clipped at 1023 is generated; however, the present invention is not limited to this example, and a configuration may be taken so as to clip a pixel value at any number of bits so long as the number of bits is smaller than that of pixel values that have been obtained from the image capturing element 102.

In step S15002, the image processing unit 104 generates a fourth image for which each pixel value of the third image has been normalized. In the normalization in this step, to normalize each pixel value of 10 bits to a range from 0 to 1, the image processing unit 104 divides each pixel value by 2 to the power of 10. The calculation result is handled in a float32 format, which includes digits after the decimal point, or the like. In step S15003, the image processing unit 104 generates a fifth image for which gamma correction has been applied to each pixel value of the fourth image. The processing for de-gamma correction in this step is the same processing as that of the above-described step S3007.

In step S15004, the image processing unit 104 generates a sixth image for which normalization has been canceled so as to result in 8 bits for each pixel value of the fifth image. The cancelation of normalization in this step is the same processing as that of step S3008. In step S15005, the image processing unit 104 inputs the sixth image to the neural network. This neural network is a neural network that has been trained to appropriately remove noise from the image that has been gamma-corrected in step S15003.

In step S15006, the image processing unit 104 generates an eighth image for which each pixel value of the seventh image that is outputted from the neural network has been normalized. The normalization here is the same processing as that of step S3010. In step S15007, the image processing unit 104 generates a ninth image for which de-gamma correction has been applied to each pixel value of the eighth image. The processing for de-gamma correction in this step is the same processing as that of step S3011. In step S15008, the image processing unit 104 generates a tenth image for which normalization has been canceled by 10 bits for each pixel value of the ninth image. In the processing for cancelation of normalization in this step, the image processing unit 104 cancels normalization so as to result in 10 bits and, therefore, multiplies each pixel value by 2 to the power of 10. The calculation result is handled in 10 bits.

In step S15009, the image processing unit 104 generates an eleventh image for which the tenth image, which has been generated in step S15008, and the second image have been α-blended. The image processing unit 104 executes a blending in accordance with inputted pixel values. The image processing unit 104 multiplies the second image by a coefficient (1-α), multiplies the tenth image by a coefficient α, and then adds the results after the multiplication. The α value at this time is linearly converted between 0 and 1 in accordance with a size of a pixel value. However, this a blending does not necessarily need to be performed.

In step S15010, the image processing unit 104 generates a twelfth image for which an offset has been added to each pixel value of the eleventh image. After generating the twelfth image, the processor 106 terminates the series of processes.

As described above, in the present embodiment, a configuration has been taken so as to clip data to be inputted to a neural network. This makes it possible to generate an image in which a lot of information of a dark portion is retained. A configuration has also been taken so as to α-blend an image before processing using the neural network for information of a bright portion which has been clipped and lost. This makes it possible to restore information that has been lost due to clipping.

A case where a software program for realizing the functions of the above-described embodiments is executed is also included in the present invention. Therefore, a program code itself that is supplied to and installed in a computer in order to realize the functional processing of the present invention by the computer also realizes the present invention. That is, a computer program itself for implementing the functional processing of the present invention is also included in the present invention. In such a case, the program may be in any form, such as object code, a program to be executed by an interpreter, or script data that is supplied to an OS, so long as it has the functions of a program.

A storage medium for supplying the program may be, for example, a hard disk, a magnetic storage medium such as a magnetic tape, an optical/magneto-optical storage medium, or a non-volatile semiconductor memory. As a method of supplying the program, a method such as that in which a computer program that forms the present invention is stored in a server on a computer network and a connected client computer downloads and programs the computer program can be conceived.

Disclosure of Present Specification

The disclosure of the present specification includes the following image processing apparatus, image processing method, generation method, and programs.

(Item 1) The present specification discloses:

an image processing apparatus comprising: a tone compression unit configured to compress tones of first image data;

a processing unit configured to, by applying a neural network that performs predetermined image processing on image data whose tones have been compressed by the tone compression unit, output image data on which the predetermined image processing has been performed; and a tone decompression unit configured to decompress the tones of the image data on which the predetermined image processing has been performed, wherein the number of bits that represent a pixel value in the neural network is smaller than the number of bits that represent a pixel value of the first image data, and the tone compression unit compresses tones using a characteristic that the lower the brightness, more tones are allocated.

(Item 2) The present specification discloses:

the image processing apparatus according to item 1, further comprising: an obtainment unit configured to obtain a brightness of the first image data, wherein in accordance with the brightness obtained by the obtainment unit, the tone compression unit compresses the tones of the first image data using a different characteristic among a plurality of characteristics that the lower the brightness, more tones are allocated.

(Item 3) The present specification discloses:

the image processing apparatus according to item 2, wherein in accordance with the brightness obtained by the obtainment unit, the processing unit applies the neural network using different parameters among a plurality of sets of parameters of the neural network that has been trained in advance.

(Item 4) The present specification discloses:

the image processing apparatus according to item 2 or 3, wherein in accordance with the brightness obtained by the obtainment unit, the tone decompression unit decompresses tones of image data using a different characteristic among a plurality of characteristics for decompressing tones.

(Item 5) The present specification discloses:

the image processing apparatus according to item 2, wherein the obtainment unit obtains a brightness of the first image data that has been captured at a first time and a brightness of second image data that has been captured at a second time that is after the first time, and the tone compression unit compresses tones of the second image data using, among the plurality of characteristics that correspond to a brightness of image data and differ stepwise, a second characteristic that is adjacent to a first characteristic that corresponds to the brightness of the first image data.

(Item 6) The present specification discloses:

the image processing apparatus according to item 5, wherein the processing unit applies the neural network using a set of parameters that is associated with the second characteristic among a plurality of sets of the parameters of the neural network that are associated with the plurality of characteristics that correspond to a brightness of image data and differ stepwise.

(Item 7) The present specification discloses:

the image processing apparatus according to item 5 or 6, wherein the tone decompression unit decompresses tones of image data using a characteristic that corresponds to the second characteristic among a plurality of characteristics that are for decompressing tones and differ stepwise.

(Item 8) The present specification discloses:

the image processing apparatus according to item 2, wherein the obtainment unit obtains a brightness of a selected region among a plurality of regions of the first image data, and the tone compression unit compresses the tones of the first image data using a third characteristic that corresponds to the brightness of the selected region among the plurality of characteristics.

(Item 9) The present specification discloses:

the image processing apparatus according to item 8, wherein the processing unit applies the neural network using a set of parameters that corresponds to the third characteristic that corresponds to the brightness of the selected region among a plurality of sets of parameters of the neural network that are associated with the plurality of characteristics.

(Item 10) The present specification discloses:

the image processing apparatus according to item 8 or 9, wherein the selected region is a region in which a brightness for a respective region is lower than a predetermined threshold among a plurality of regions of the first image data.

(Item 11) The present specification discloses:

the image processing apparatus according to any one of items 8 to 10, wherein the selected region is a region in which a difference from a respective brightness of the same region at the same time of day up to a previous day is less than or equal to a predetermined value among a plurality of regions of the first image data.

(Item 12) The present specification discloses:

the image processing apparatus according to item 1, wherein in accordance with a predetermined setting, the tone compression unit compresses the tones of the first image data using a different characteristic among a plurality of characteristics that the lower the brightness, the more tones are allocated.

(Item 13) The present specification discloses:

the image processing apparatus according to item 12, wherein for the predetermined setting whose the number of bits that represent a pixel value of image data to be processed is greater, the tone compression unit uses a characteristic that more tones are allocated in a predetermined low luminance region.

(Item 14) The present specification discloses:

the image processing apparatus according to item 12 or 13, wherein in accordance with the predetermined setting, the processing unit applies the neural network using different parameters among a plurality of sets of parameters of the neural network that has been trained in advance.

(Item 15) The present specification discloses:

the image processing apparatus according to any one of items 12 to 14, wherein in accordance with the predetermined setting, the tone decompression unit decompresses tones of image data using a different characteristics among a plurality of characteristics for decompressing tones.

(Item 16) The present specification discloses:

the image processing apparatus according to any one of items 12 to 15, wherein the predetermined setting is a setting for image data to be outputted from the image processing apparatus.

(Item 17) The present specification discloses:

the image processing apparatus according to item 16, wherein the setting for image data to be outputted from the image processing apparatus includes any of a characteristic to be used for tone compression, a characteristic to be used for tone decompression, the number of tones of the image data to be outputted, and the number of bits that represent a pixel value of the image data to be outputted.

(Item 18) The present specification discloses:

the image processing apparatus according to any one of items 12 to 15, wherein the predetermined setting is a setting for image data to be inputted to the neural network.

(Item 19) The present specification discloses:

the image processing apparatus according to item 18, wherein the setting for image data to be inputted to the neural network includes any of an upper limit value of a pixel value of the image data to be inputted to the neural network, the number of tones of the image data, and the number of bits that represent a pixel value of the image data.

(Item 20) The present specification discloses:

the image processing apparatus according to any one of items 12 to 19, further comprising: a composite unit configured to composite image data that has been decompressed by the tone decompression unit and the first image data.

(Item 21) The present specification discloses:

the image processing apparatus according to item 20, wherein the first image data includes image data that has been clipped using a predetermined upper limit value of a pixel value.

(Item 22) The present specification discloses:

an image processing apparatus, which trains a neural network, the apparatus comprising:

a tone compression unit configured to compress tones of image data of a training image and tones of image data of a ground truth image;

a processing unit configured to, by applying a neural network that performs predetermined image processing on image data for which the tones of the image data of the training image have been compressed, output image data on which the predetermined image processing has been performed; and a change unit configured to change parameters of the neural network based on an error between the image data on which the predetermined image processing has been performed and image data for which the tones of the image data of the ground truth image has been compressed, wherein the number of bits that represent a pixel value in the neural network is smaller than the number of bits that represent a pixel value of the image data of the training image, and the tone compression unit compresses tones using a characteristic that the lower the brightness, more tones are allocated.

(Item 23) The present specification discloses:

an image processing method comprising: compressing tones of first image data;

by applying a neural network that performs predetermined image processing on image data whose tones have been compressed, outputting image data on which the predetermined image processing has been performed; and decompressing the tones of the image data on which the predetermined image processing has been performed, wherein the number of bits that represent a pixel value in the neural network is smaller than the number of bits that represent a pixel value of the first image data, and in the compressing, tones are compressed using a characteristic that the lower the brightness, more tones are allocated.

(Item 24) The present specification discloses:

a generation method of a trained neural network for which each step is performed in an image processing apparatus, the method comprising:

compressing tones of image data of a training image and tones of image data of a ground truth image;

by applying a neural network that performs predetermined image processing on image data for which the tones of the image data of the training image have been compressed, outputting image data on which the predetermined image processing has been performed; and changing parameters of the neural network based on an error between the image data on which the predetermined image processing has been performed and image data for which the tones of the image data of the ground truth image has been compressed, wherein the number of bits that represent a pixel value in the neural network is smaller than the number of bits that represent a pixel value of the image data of the training image, and in the compressing, tones are compressed using a characteristic that the lower the brightness, more tones are allocated.

(Item 25) The present specification discloses:

a program for causing a computer to function as each unit of the image processing apparatus according to any one of items 1 to 21.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-197872, filed Dec. 6, 2021 and Japanese Patent Application No. 2022-161834, filed Oct. 6, 2022 which are hereby incorporated by reference herein in their entirety.

What is claimed is:

1. An image processing apparatus comprising:

one or more processors; and a memory storing instructions which, when the instructions are executed by the one or more processors, cause the image processing apparatus to function as a plurality of units comprising:

(1) an obtainment unit configured to obtain a brightness of first image data;

(2) a tone compression unit configured to, in accordance with the brightness obtained by the obtainment unit, compress tones of the first image data using a selected characteristic among a plurality of characteristics in which the lower the brightness, more tones are allocated;

(3) a processing unit configured to, by applying a neural network that performs predetermined image processing on image data whose tones have been compressed by the tone compression unit, output image data on which the predetermined image processing has been performed;

(4) a tone decompression unit configured to decompress the tones of the image data on which the predetermined image processing has been performed, wherein the image data is decompressed by using a characteristic that corresponds to the characteristic used in the tone compression unit; and (5) a selection unit configured to, in accordance with the characteristic used in the tone compression unit, select one neural network from among a plurality of neural networks, each of which has been trained in advance for a different respective characteristic that may be used in the tone compression unit, the selected neural network being used by the processing unit to perform the predetermined image processing on the image data whose tones have been compressed by the tone compression unit, wherein, when changing from a current characteristic among the plurality of characteristics to a different characteristic among the plurality of characteristics, a characteristic adjacent to the current characteristic is selected, and the current characteristic is changed stepwise to the different characteristic, wherein, in accordance with the stepwise change of the characteristic, a current neural network is also changed stepwise, and wherein the number of bits that represent a pixel value in the neural network is smaller than the number of bits that represent a pixel value of the first image data.

2. The image processing apparatus according to claim 1, wherein the obtainment unit obtains the brightness of the first image data that has been captured at a first time and a brightness of second image data that has been captured at a second time that is after the first time, and wherein the tone compression unit compresses tones of the second image data using, among the plurality of characteristics that correspond to a brightness of image data and differ stepwise, a second characteristic that is adjacent to a first characteristic that corresponds to the brightness of the first image data.

3. The image processing apparatus according to claim 2, wherein the tone decompression unit decompresses tones of image data using a characteristic that corresponds to the second characteristic among a plurality of characteristics that are for decompressing tones and differ stepwise.

4. The image processing apparatus according to claim 1, wherein the obtainment unit obtains a brightness of a selected region among a plurality of regions of the first image data, and wherein the tone compression unit compresses the tones of the first image data using a third characteristic that corresponds to the brightness of the selected region among the plurality of characteristics.

5. The image processing apparatus according to claim 4, wherein the selection unit selects the neural network in accordance with the third characteristic, and wherein the processing unit applies the selected neural network to perform the predetermined image processing on the image data whose tones have been compressed using the third characteristic.

6. The image processing apparatus according to claim 4, wherein the selected region is a region in which a brightness for a respective region is lower than a predetermined threshold among a plurality of regions of the first image data.

7. The image processing apparatus according to claim 1, wherein in accordance with a predetermined setting, the tone compression unit compresses the tones of the first image data using a selected characteristic among the plurality of characteristics in which the lower the brightness, more tones are allocated.

8. The image processing apparatus according to claim 7, wherein for the predetermined setting whose number of bits that represent a pixel value of image data to be processed is greater, the tone compression unit uses a characteristic that more tones are allocated in a predetermined low luminance region.

9. The image processing apparatus according to claim 7, wherein in accordance with the predetermined setting, the selection unit selects the neural network in accordance with the predetermined setting, and wherein the processing unit applies the selected neural network to perform the predetermined image processing on the image data whose tones have been compressed.

10. The image processing apparatus according to claim 7, wherein in accordance with the predetermined setting, the tone decompression unit decompresses tones of image data using a selected characteristic among a plurality of characteristics for decompressing tones.

11. The image processing apparatus according to claim 7, wherein the predetermined setting is a setting for image data to be outputted from the image processing apparatus.

12. The image processing apparatus according to claim 11, wherein the setting for image data to be outputted from the image processing apparatus includes any of a characteristic to be used for tone compression, a characteristic to be used for tone decompression, the number of tones of the image data to be outputted, and the number of bits that represent a pixel value of the image data to be outputted.

13. The image processing apparatus according to claim 7, wherein the predetermined setting is a setting for image data to be inputted to the neural network.

14. The image processing apparatus according to claim 13, wherein the setting for image data to be inputted to the neural network includes any of an upper limit value of a pixel value of the image data to be inputted to the neural network, the number of tones of the image data, and the number of bits that represent a pixel value of the image data.

15. The image processing apparatus according to claim 7, wherein the instructions further cause the image processing apparatus to function as: a composite unit configured to composite image data that has been decompressed by the tone decompression unit and the first image data.

16. The image processing apparatus according to claim 15, wherein the first image data includes image data that has been clipped using a predetermined upper limit value of a pixel value.

17. An image processing method comprising:

obtaining a brightness of first image data;

compressing, in accordance with the brightness obtained in the obtaining, tones of the first image data using a selected characteristic among a plurality of characteristics in which the lower the brightness, more tones are allocated;

by applying a neural network that performs predetermined image processing on image data whose tones have been compressed, outputting image data on which the predetermined image processing has been performed;

decompressing the tones of the image data on which the predetermined image processing has been performed, wherein the image data is decompressed by using a characteristic that corresponds to the characteristic used in the tone compressing; and in accordance with the characteristic used in the tone compressing, selecting one neural network from among a plurality of neural networks, each of which has been trained in advance for a different respective characteristic that may be used in the tone compressing, the selected neural network being used to perform the predetermined image processing on the image data whose tones have been compressed in the tone compressing, wherein, when changing from a current characteristic among the plurality of characteristics to a different characteristic among the plurality of characteristics, a characteristic adjacent to the current characteristic is selected, and the current characteristic is changed stepwise to the different characteristic, wherein, in accordance with the stepwise change of the characteristic, a current neural network is also changed stepwise, and wherein the number of bits that represent a pixel value in the neural network is smaller than the number of bits that represent a pixel value of the first image data.

18. A non-transitory computer-readable storage medium comprising instructions for performing an image processing method, the method comprising:

obtaining a brightness of first image data;

compressing, in accordance with the brightness obtained in the obtaining, tones of the first image data using a selected characteristic among a plurality of characteristics in which the lower the brightness, more tones are allocated;

by applying a neural network that performs predetermined image processing on image data whose tones have been compressed, outputting image data on which the predetermined image processing has been performed;

decompressing the tones of the image data on which the predetermined image processing has been performed, wherein the image data is decompressed by using a characteristic that corresponds to the characteristic used in the tone compressing; and in accordance with the characteristic used in the tone compressing, selecting one neural network from among a plurality of neural networks, each of which has been trained in advance for a different respective characteristic that may be used in the tone compressing, the selected neural network being used to perform the predetermined image processing on the image data whose tones have been compressed in the tone compressing, wherein, when changing from a current characteristic among the plurality of characteristics to a different characteristic among the plurality of characteristics, a characteristic adjacent to the current characteristic is selected, and the current characteristic is changed stepwise to the different characteristic, wherein, in accordance with the stepwise change of the characteristic, a current neural network is also changed stepwise, and wherein the number of bits that represent a pixel value in the neural network is smaller than the number of bits that represent a pixel value of the first image data.

* * * * *